United States Patent [19]
Brackett

[11] Patent Number: 5,938,224
[45] Date of Patent: Aug. 17, 1999

[54] HYDRAULIC BICYCLE WITH CONJUGATE DRIVE MOTORS AND VARIABLE STROKE CRANKSHAFT

[76] Inventor: Douglas C. Brackett, 2535 Mason Oaks Dr., Valrico, Fla. 33594

[21] Appl. No.: 08/778,156

[22] Filed: Jan. 10, 1997

Related U.S. Application Data

[63] Continuation-in-part of application No. 08/629,368, Apr. 8, 1996.

[51] Int. Cl.$^6$ .................................................. B62M 19/00
[52] U.S. Cl. ........................... 280/216; 280/259; 60/468; 74/50; 92/138
[58] Field of Search ................................... 280/214, 215, 280/216, 236, 237, 259; 60/468; 180/367, 305, 307, 308; 74/49, 50; 92/138, 237

[56] References Cited

U.S. PATENT DOCUMENTS

| | | |
|---|---|---|
| 4,087,105 | 5/1978 | Amarantos . |
| 4,194,365 | 3/1980 | Stoufflet et al. . |
| 4,249,750 | 2/1981 | Kantner . |
| 4,546,990 | 10/1985 | Harriger . |
| 4,575,160 | 3/1986 | Leiber et al. . |
| 4,688,815 | 8/1987 | Smith . |
| 4,694,647 | 9/1987 | Yoshida . |
| 4,776,165 | 10/1988 | Iino . |
| 4,850,192 | 7/1989 | Mitsumasa et al. . |
| 4,887,428 | 12/1989 | Iino . |
| 4,962,644 | 10/1990 | Polacek . |
| 5,259,256 | 11/1993 | Brackett . |
| 5,351,567 | 10/1994 | Brackett . |
| 5,387,000 | 2/1995 | Sato . |
| 5,417,309 | 5/1995 | Brackett . |
| 5,423,560 | 6/1995 | Warrick et al. . |
| 5,445,039 | 8/1995 | Brackett . |
| 5,456,159 | 10/1995 | Brackett . |
| B1 5,259,256 | 6/1995 | Brackett . |

FOREIGN PATENT DOCUMENTS

| | | |
|---|---|---|
| 850405 | 7/1949 | Germany . |
| 0134064 | 4/1982 | Japan . |

*Primary Examiner*—Kevin Hurley
*Attorney, Agent, or Firm*—Selitto & Associates

[57] ABSTRACT

A device for transmitting power between mechanical movements which includes a fluid pump coupled to a first mechanical movement for pumping a fluid, a fluid motor coupled to a second mechanical movement and a manifold connecting the fluid pump and the fluid motor capable of conducting fluid output from the fluid pump to the fluid motor to drive the fluid motor and recirculate the fluid back to said fluid pump. Either the fluid pump and/or the fluid motor incorporates a conjugate drive motion translator. The power transmission is suitable for use on a bicycle replacing the typical gears and chain and preferably includes a shunt to permit the motor to override the pump, an apportionment valve to control the ratio of movement between a first and second mechanical movement, and a brake valve for stopping the second mechanical movement. Either the fluid pump and/or fluid motor may be of a variable output design incorporating a crankshaft of variable stroke, adjustable on-the-fly.

18 Claims, 21 Drawing Sheets

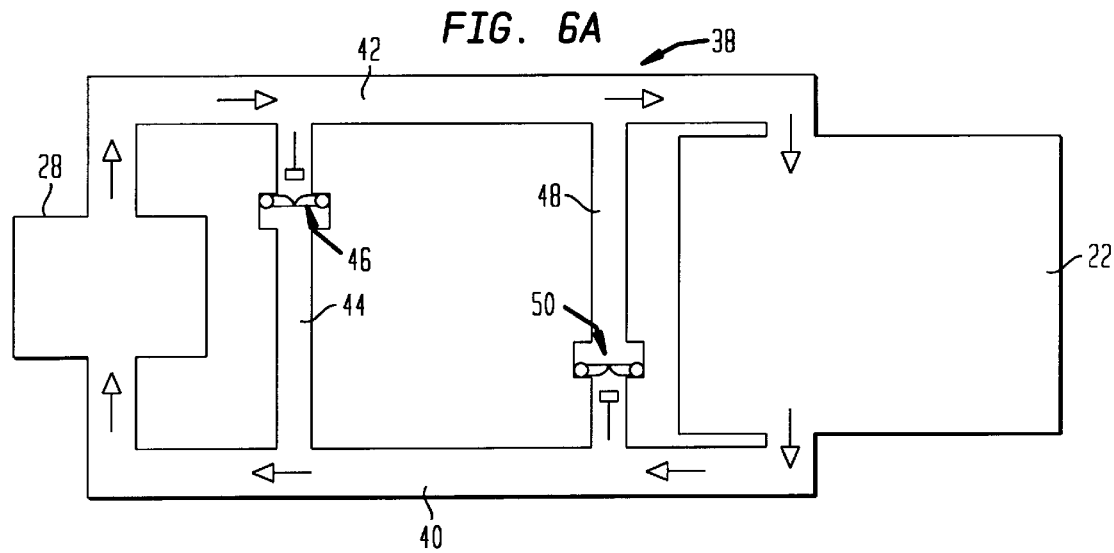
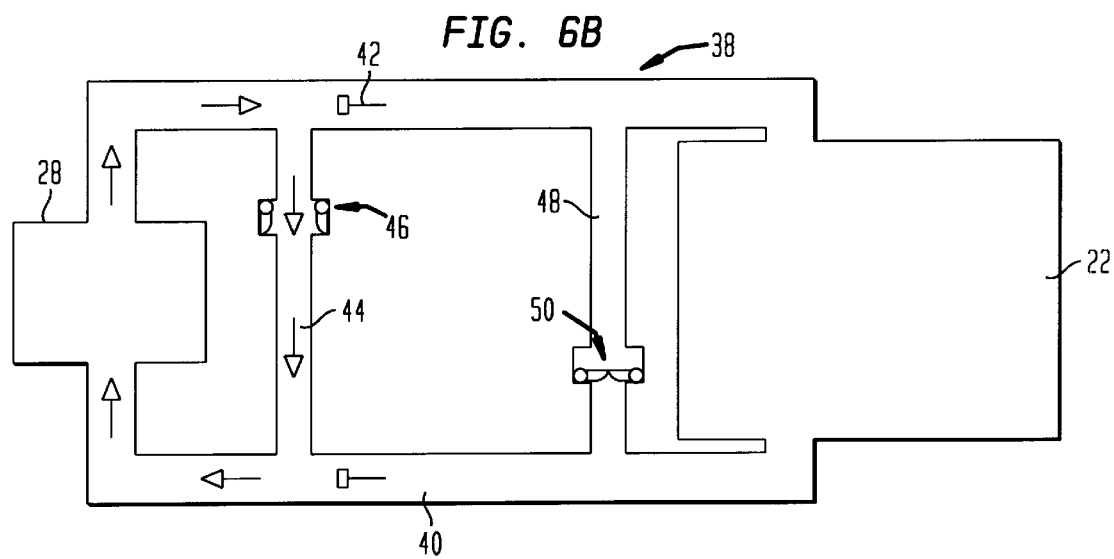
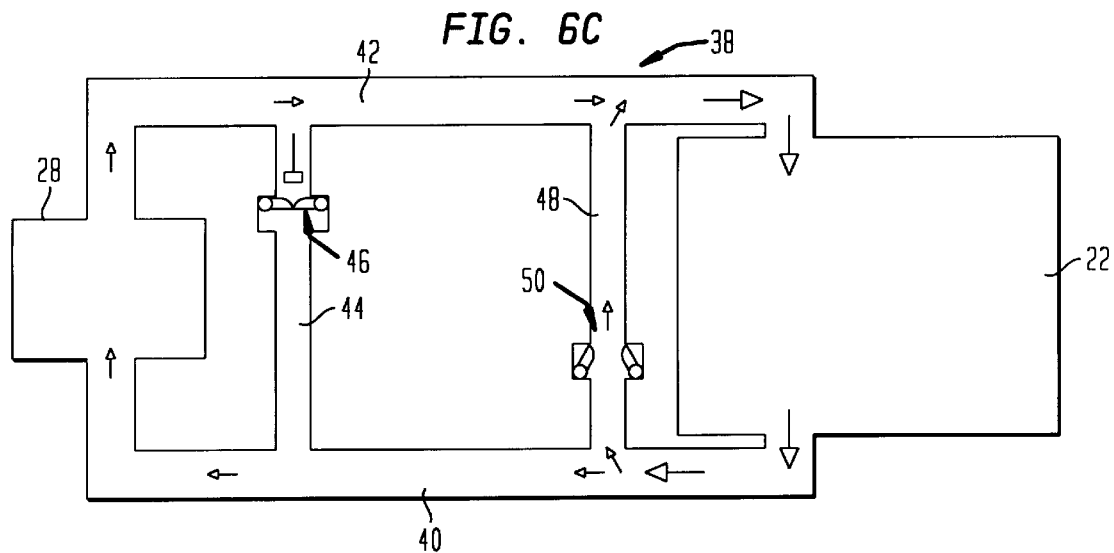

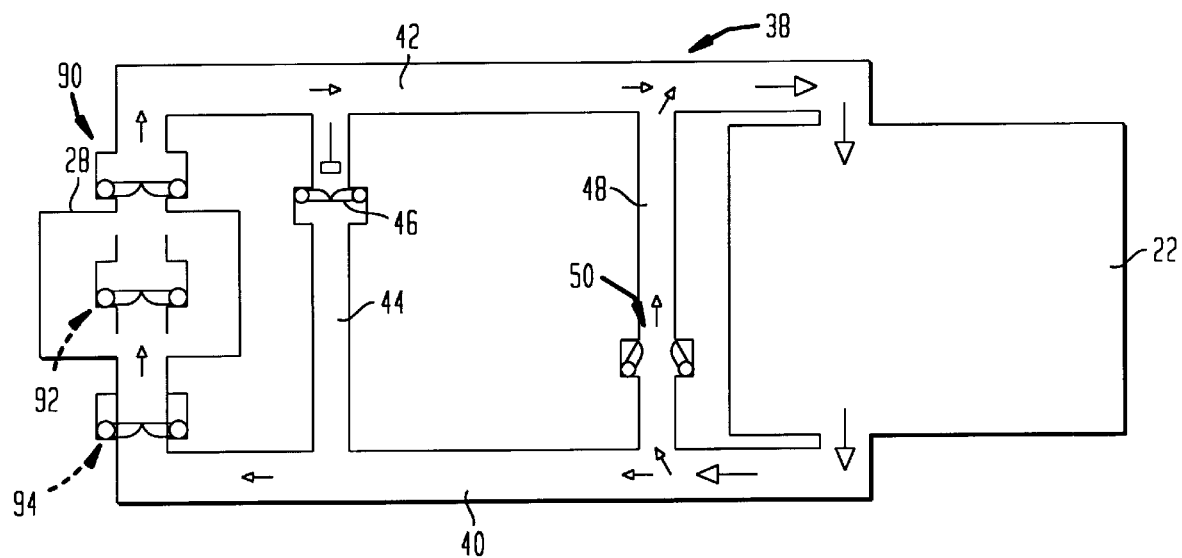

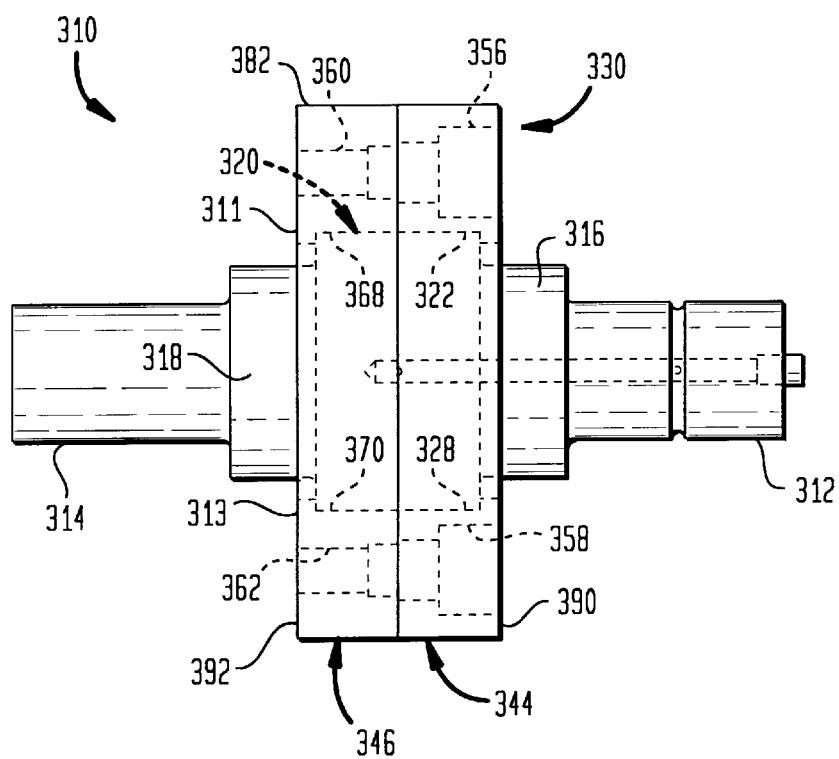
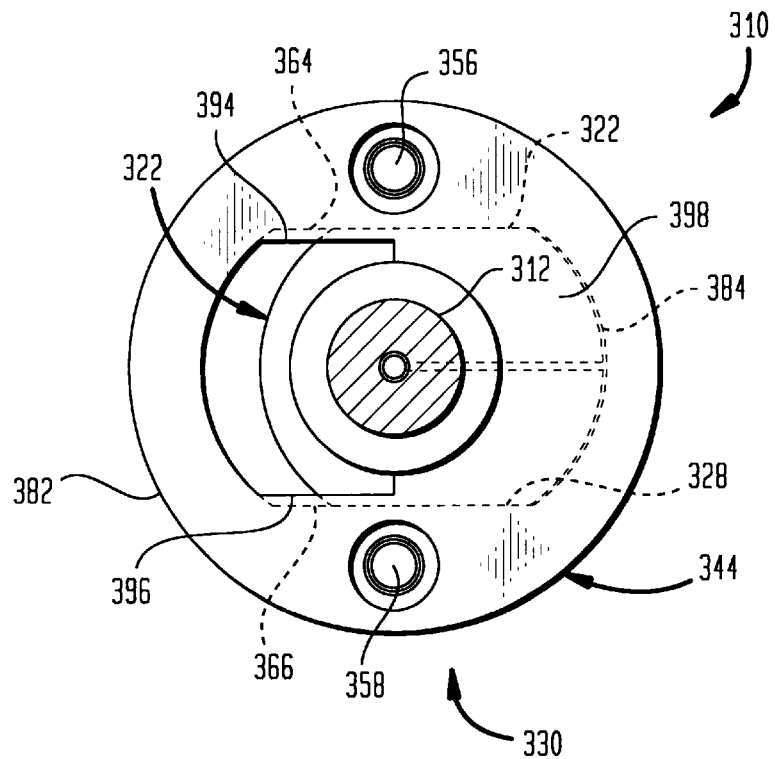

PISTON TRAVEL HORIZONTAL →

HYDRAULIC BICYCLE WITH CONJUGATE DRIVE MOTORS AND VARIABLE STROKE CRANKSHAFT

CROSS REFERENCE TO RELATED APPLICATIONS

This is a continuation-in-part of application Ser. No. 08/629,368, filed Apr. 8, 1996.

FIELD OF THE INVENTION

The present invention relates to power and motion transmission apparatus, and more particularly to a transmission mechanism for transmitting power from the pedals of a bicycle to the rear wheel.

BACKGROUND OF THE INVENTION

Various transmission apparatus have been proposed over the years employing gears, clutches, chain drives, belts and the like. As applied to the problem of bicycle propulsion, the traditional mechanism for transmitting power from the rider to a motive wheel is a chain drive wherein a drive sprocket is attached to the pedals of a bicycle and a driven sprocket is attached to the rear wheel. A chain is engaged in the teeth of the sprockets such that rotation of the pedals in a first direction induces the rear wheel to turn. The driven sprocket is generally coupled to the rear wheel via a ratchet or one-way clutch such that the sprocket acts on the rear wheel in one direction of rotation only, i.e., the forward direction, but spins freely in the other direction. This one-way coupling of the drive sprocket to the motive or driven wheel permits the bicyclist to stop pedaling when coasting or braking. It has also become quite common for bicycles to incorporate gear change apparatus to select from a set of available gear ratios between the driven sprocket and the drive sprocket. This is normally accomplished by providing a nest of progressively larger driven sprockets at the rear wheel and a number of drive sprockets coupled to the pedals. Movable chain guides in conjunction with a chain tensioner allow the bicyclist to select which sprockets are utilized by positioning the drive chain over the correct sprocket pair via levers and cables.

While the traditional bicycle chain drive has served its purposes well over the years, it does have certain limitations of functionality and safety. For example, in order to reduce weight, chain drives are typically exposed, creating a safety risk to the rider in the form of entangling clothing in the chain and sprocket. Selectable ratio bicycle transmissions are prone to shifting to the wrong gear and to positioning the chain in an intermediate position between sprockets, leading to a surprising and dangerous slipping of the chain and the consequent unbalancing of the cyclist. Because the chain and sprocket require lubrication, they become a magnet for dust and dirt which impedes efficient power transmission, wears the chain and sprockets and frequently ruins clothing that contacts it by imparting a dirty, greasy stain.

It is therefore an object of the present invention to provide a transmission that reliably and efficiently transmits power from a first mechanical movement to a second. It is a further an object to provide a transmission which can be applied to a bicycle that is cleaner, safer and easier to use than a chain drive.

SUMMARY OF THE INVENTION

The problems and disadvantages associated with the conventional techniques and devices utilized to transmit power between mechanical movements are overcome by the present invention which includes a fluid pump coupled to a first mechanical movement for pumping a fluid, a fluid motor coupled to a second mechanical movement and a manifold connecting the fluid pump and the fluid motor. The manifold is capable of conducting fluid output from the fluid pump to the fluid motor to drive the fluid motor. Fluid is recirculated back to the fluid pump. In one embodiment, the fluid pump and/or the fluid motor incorporates a conjugate drive motion translator. In a second embodiment, the fluid pump and/or motor incorporates a variable stroke crankshaft, variable on the fly and during the operation of the device.

BRIEF DESCRIPTION OF THE FIGURES

For a better understanding of the present invention, reference is made to the following detailed description of an exemplary embodiment considered in conjunction with the accompanying drawings, in which:

FIGS. 6A–6C are schematic views of the pedal engine/wheel motor and connecting manifold of FIGS. 1–5 in three different modes of operation, viz., fully hydraulically engaged engine-to-wheel motor turn ratio (6A), coast mode (6B) and at partial hydraulic slip turn ratio (6C);

FIG. 7 is a schematic view of the present invention as shown in FIG. 6C and further schematically depicting a brake.

FIG. 20 is a plan view of a third adjustable crankshaft assembly constructed in accordance with an exemplary embodiment of the present invention;

FIG. 21 is a front view of the crankshaft assembly illustrated in FIG. 20;

DERAILED DESCRIPTION OF THE FIGURES

Figure 1:
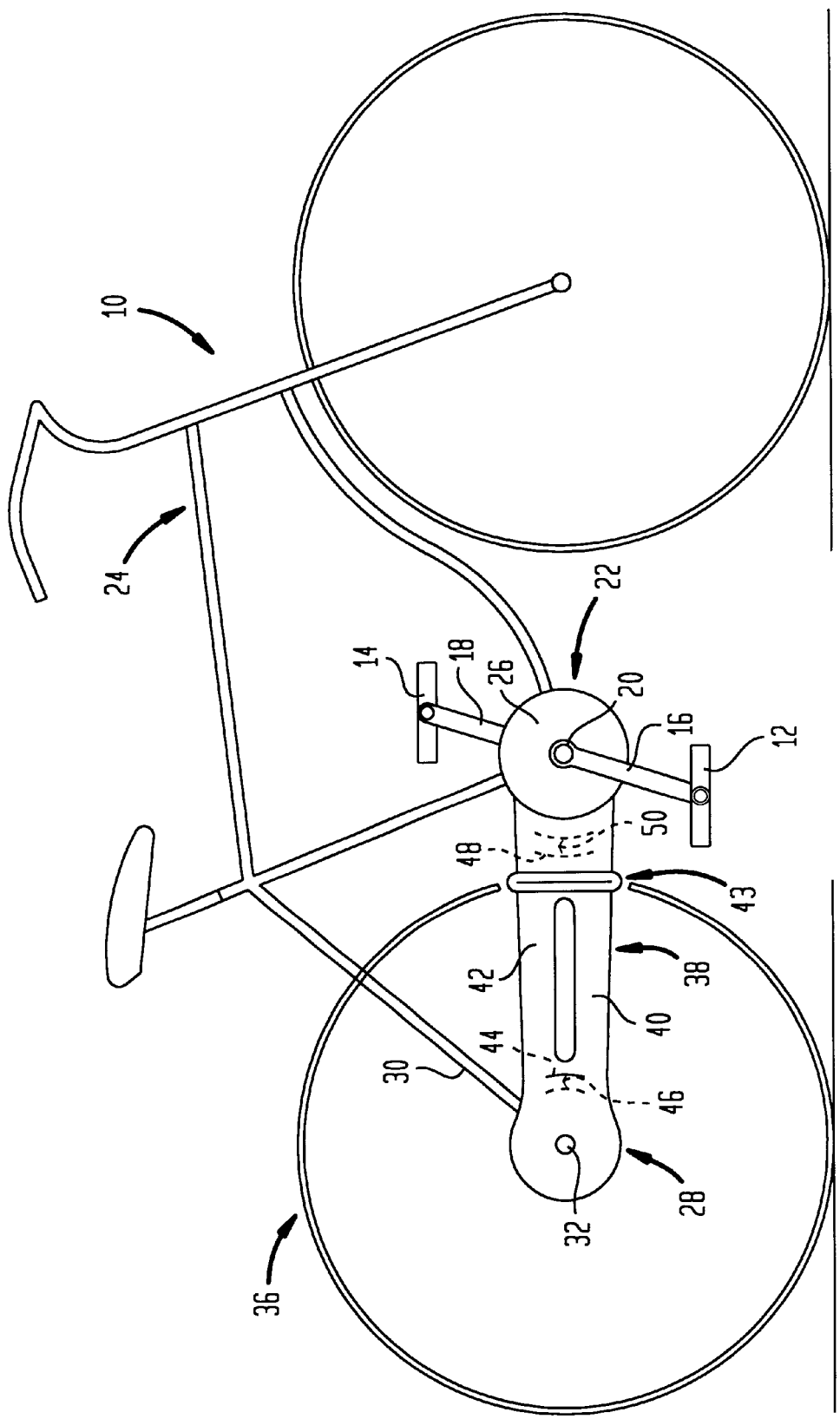
FIG. 1 is an elevational view of a bicycle in accordance with an exemplary embodiment of the present invention.

FIG. 1 shows a bicycle 10 having a pair of pedals 12, 14 for receiving the feet of a rider. The pedals 12, 14 are rotatably mounted on a pair of pedal cranks 16, 18, respectively, in a conventional manner. Unlike a traditional bicycle where the cranks 16, 18 would be mounted to a drive sprocket shaft, in the present invention, the cranks 16, 18 are mounted to the shaft 20 of a pedal engine 22. The pedal engine 22 is a positive displacement pump for pumping fluids such as hydraulic fluid, oils and gases that is mounted to the bicycle frame 24 with the engine block 26 stationary and the shaft 20 free to rotate as controlled by the rotation of the pedals 12, 14 by the rider. The method of mounting the engine 22 is conventional and in the manner of that by which internal combustion engines are mounted to the frames of mopeds and motorcycles. A wheel motor 28 of essentially the same general design as the pedal engine 22, viz., that of a positive displacement pump, is mounted to the rear forks 30 of the bicycle frame 24. The shaft 32 of the wheel motor 28 is stationary relative to the bicycle frame 24 and may be threaded on either end to approximate the configuration of a traditional rear sprocket shaft which is held onto the rear fork 30 by nuts which compress the forks inward against a land on the shaft 32. The wheel motor block 34 (see FIG. 2) is rotatable about the wheel motor shaft 32 in conjunction with the rear wheel 36. The exterior of the wheel motor block 34 may be configured in the form of a spindle having a pair of spaced, drilled flanges with a plurality of holes for receiving the spokes of the rear wheel 36 or may be held fast to an independent wheel spindle or a solid wheel disk web by bolts or the like.

A manifold 38 is provided to carry the fluid pumped out of the pedal engine 22 to the rear wheel motor 28 to establish a hydraulic connection for transmitting power from the pedals 12, 14 to the rear wheel 36. As stated previously and as will be appreciated from FIGS. 3, 4 and 5, the pedal engine 22 and the wheel motor 28 are both positive displacement pumps, such that the rotation of the pedals 12, 14 a selected number of degrees will correspond to a predetermined output volume of working fluid transmitted to the wheel motor 28 via a first conduit, viz., the feeder conduit 40. In similar fashion, the reception of a given volume of fluid under pressure at the wheel motor 28 will generate a corresponding predetermined number of degrees of rotation of the motor block 34 and the rear wheel 36 to which it is coupled. Given that the hydraulic connection between the pedal engine 22 and the wheel motor 28 is to be maintained without interruption by contaminants in the working fluid, such as a fluid of different density, e.g., air in a system using hydraulic fluid, the wheel motor 28, the manifold 38 and pedal engine 22 have all swept volumes thereof filled with fluid at all times. As a consequence, when the wheel motor 28 is rotated by the fluid output of the pedal engine 22, a fluid output from the wheel motor 28 is induced which is redirected back to input of the pedal engine 22 through a second conduit in the manifold, viz., return conduit 42. Thus, the manifold 38 redirects fluid back from the wheel motor 28 to the pedal engine 22 in circuitous fashion such that the same working fluid is constantly recycled. Since the entire system is filled with fluid, Pascal's law dictates that the fluid pressure will be equal on all surfaces within a closed volume. Accordingly, the work force will be divided between the pressure and suction side of the wheel motor.

Preferably, the interior contours and volumetric capacity of the manifold 38 is optimized using known hydraulic principles and methods to maximize flow therethrough and to prevent unnecessary fluid turbulence, friction and back pressure. The capacity of the manifold 38 is selected to accommodate the flow volume without appreciable back pressure. The manifold 38 may be cast of any light material such as plastic or aluminum, or may be formed from mandrel bent tubing of suitable volumetric capacity. The manifold 38 is connected to the inlet and outlet ports of the pedal engine 22 and wheel motor 28 in accordance with methods known to those in the art of hydraulic connections and fluid pumps. For example, the pedal engine 22 may be provided with inlet and outlet ports having a suitable surrounding surface for seating a compression gasket interposed between the manifold 38 and the engine 22. Similarly O-ring seals and/or threaded fittings may be employed.

Alternatively, the manifold may be formed as a continuous casting or molding in continuity with the pedal engine 22 and/or wheel motor 28. To facilitate changing the rear wheel, the manifold 38 may be provided with a flexible link 43 made of an elastomeric material that allows the manifold 38 to be bent such that the manifold 38 and/or wheel motor 28 swings clear of the frame 30 and/or rear wheel 36.

As is known from traditional bicycle designs, it is highly desirable to have a mode of operation wherein the drive wheel can freewheel when overtaking the pedalling action of the rider, such as when the rider rests or coasts. This function may be performed by the present invention by including a first shunt manifold passage or coast shunt passage 44 (phantom view) that permits fluid recirculation into and out of the wheel motor 28 without fluid coupling to the pedal engine 22. A one-way shunt valve 46 (phantom view) must be provided to control the passage of fluid through the coast shunt passage 44. The flow direction that is enabled through the shunt valve 46 is from the return conduit 42 to the feeder conduit 40. The shunt valve 46 may be any spring loaded or pressure activated valve, such as a spring loaded or pressure activated poppet valve, a reed valve or the like. In operation, when pedalling is stopped and the cycle continues to coast, the rotating wheel 36 causes the wheel motor 28 to pump fluid. Because the fluid output of the wheel motor 28 is not received by the pedal engine 22, which is stationary, and because there is no new fluid supplied to the input side of the wheel motor 28, pressure builds in the coast shunt passage 44 overcoming the closure pressure of the shunt valve 46 allowing fluid to pass through the coast shunt passage 44 and the local portion of the feeder conduit 40 leading to the inlet side of the wheel motor 28.

The present invention also accommodates the desire to partially or wholly disengage the hydraulic drive by providing a power shunt passage 48 (phantom view) connecting the feeder conduit 40 to the return conduit 42 and controlled by a power shunt valve 50 (clutch valve). The power shunt valve 50 controls the amount of fluid output from the pedal engine 22 that is shunted or recirculated back to the pedal engine 22 input at a given pressure rather than being directed to the input of the wheel motor 28. By controlling the volume of fluid reaching the wheel motor 28 for a given number of degrees of pedal rotation, the ratio of degrees of pedal rotation to degrees of drive wheel rotation can be controlled. The power shunt passage 48 and power shunt valve 50 therefore give the present invention some of the characteristics of an infinitely variable ratio transmission. With the power shunt valve 50 closed, all of the fluid pumped out of the pedal engine 22 is directed by the feeder conduit 40 to the wheel motor 28 producing the highest number of revolutions per minute for the drive wheel 36. As the shunt valve 50 is opened, a portion of the fluid output of the pedal motor 22 bleeds back through the power shunt passage 48 to the return conduit 42 on the intake side of the pedal engine 22. Since a portion of the fluid output of the pedal engine 22 is recirculated without passing through the wheel motor 28, the wheel motor 28 rotates at a lower rpm. For example, if the pedal engine 22 and the wheel motor 28 each displace one hundred cubic centimeters of fluid volume in one revolution and the power shunt valve 50 is closed, then one revolution of the pedal engine 22 would produce one revolution of the wheel motor 28. For this same set of conditions, if the power shunt valve 50 is opened to allow one-quarter of the pedal engine 22 pump output to be recirculated back to its inlet side, then the wheel motor 28 will rotate only three quarters of a revolution.

As a second example, if the pedal engine 22 displaces one hundred cubic centimeters of fluid in one revolution and the wheel motor 28 displaces twenty-five cubic centimeters of fluid in one revolution with the power shunt valve 50 closed, then one revolution of the pedal engine 22 will result in four revolutions of the wheel motor 28. Under the same conditions, if the power shunt valve 50 were opened to permit three quarters of the pedal engine 22 output to be recirculated to its input side, then one revolution of the pedal engine 22 will generate one revolution of the wheel motor 28.

Both the coast shunt valve 46 and the power shunt valve 50 may be manually controllable, semi-automatic or fully automatic. For example, the coast shunt valve 46 could be actuated by a hand lever, be enabled by manual control, or automatically respond to pressure differentials by virtue of a spring's compressibility characteristics under a given pressure. Similarly, actuation of the power shunt valve 50 may be manual, enabled to occur (semiautomatic) or automatic under the control of a centrifugal governor or electronic control. While the power shunt valve 50 provides turn ratio control at a given hydrostatic pressure, the shunt valve 50 does not provide maximum mechanical advantage or torque control. To achieve same, the present invention employs a variable output pump or motor as described below.

Figure 2:
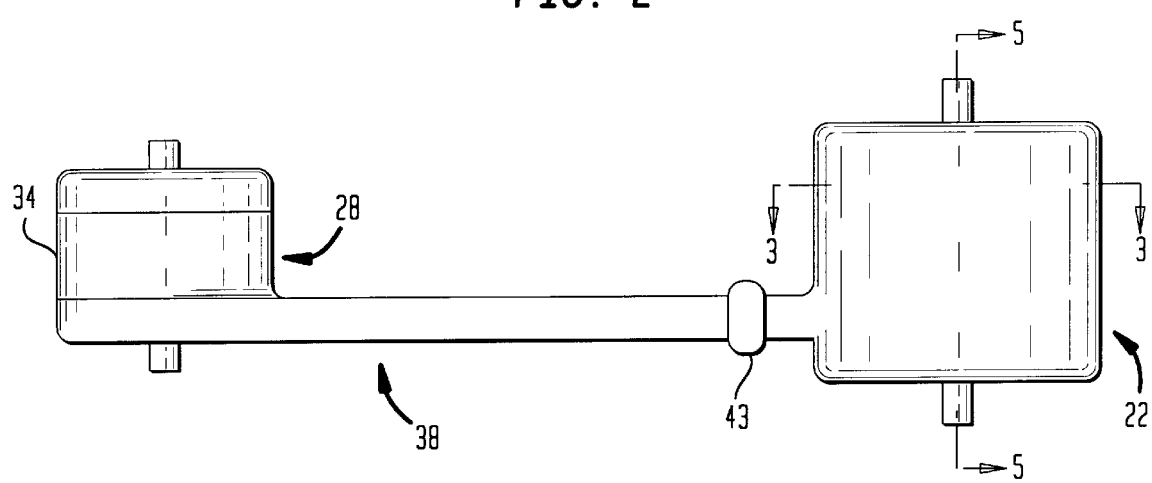
FIG. 2 is a plan view of the pedal engine/wheel motor with connecting manifold of the bicycle of FIG. 1.

FIG. 2 shows a top view of pedal engine 22, wheel motor 28 and manifold 38.

Figure 3:
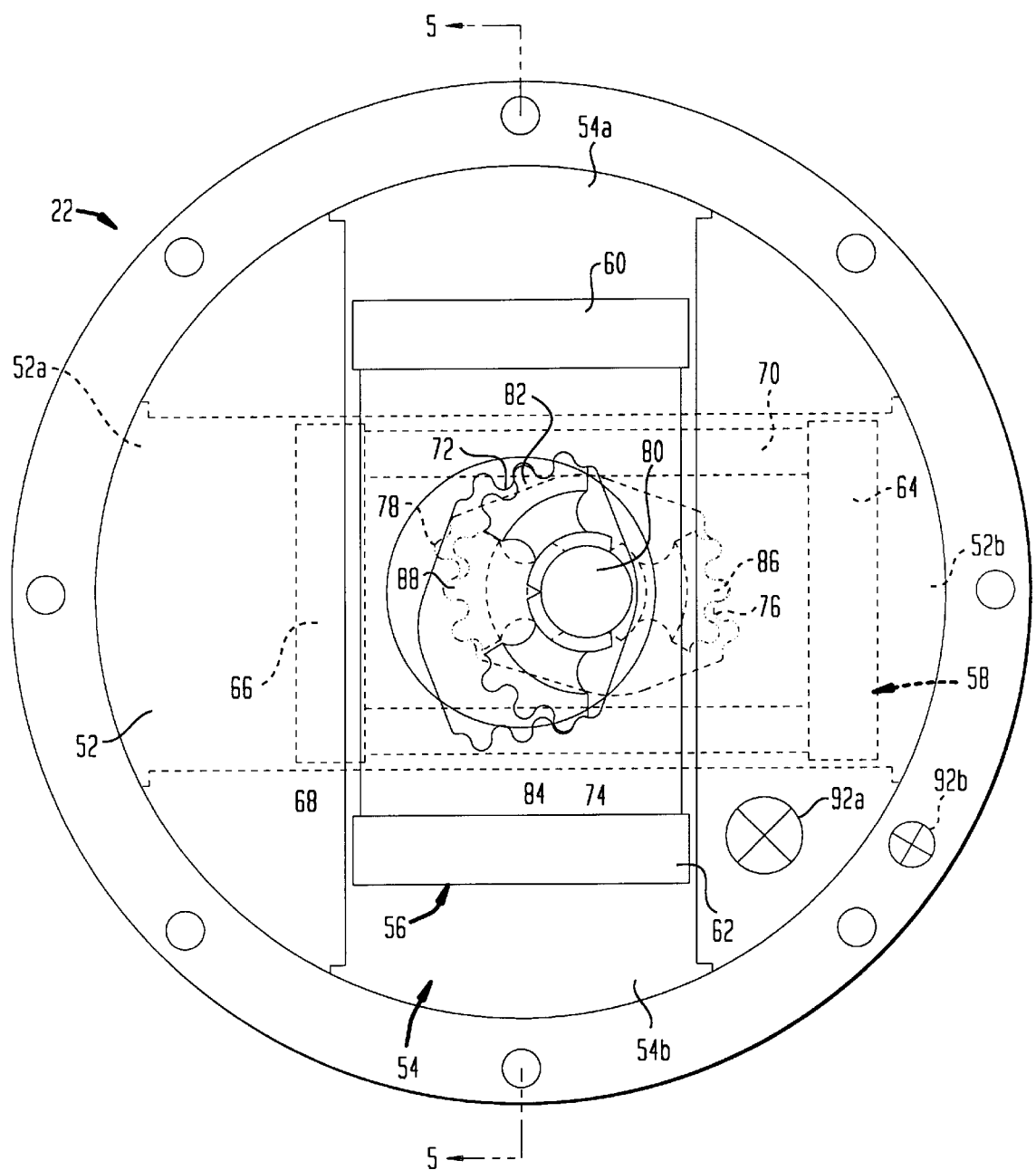
FIG. 3 is a cross-sectional view of the pedal engine/wheel motor of the bicycle of FIGS. 1 and 2, taken along section line III—III and looking in the direction of the arrows.
Figure 4:
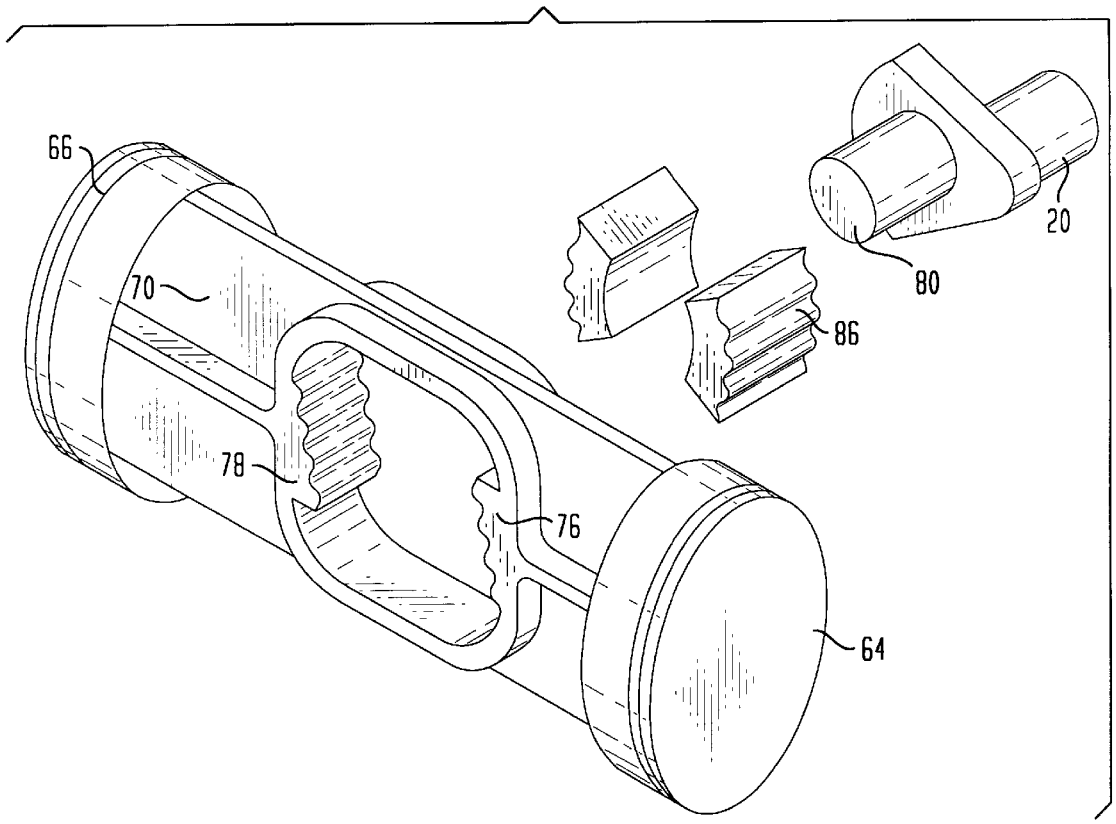
FIG. 4 is an exploded view of the piston set, mating conjugate driver and crankpin of the pedal engine/wheel motor shown in FIG. 3.
Figure 5:
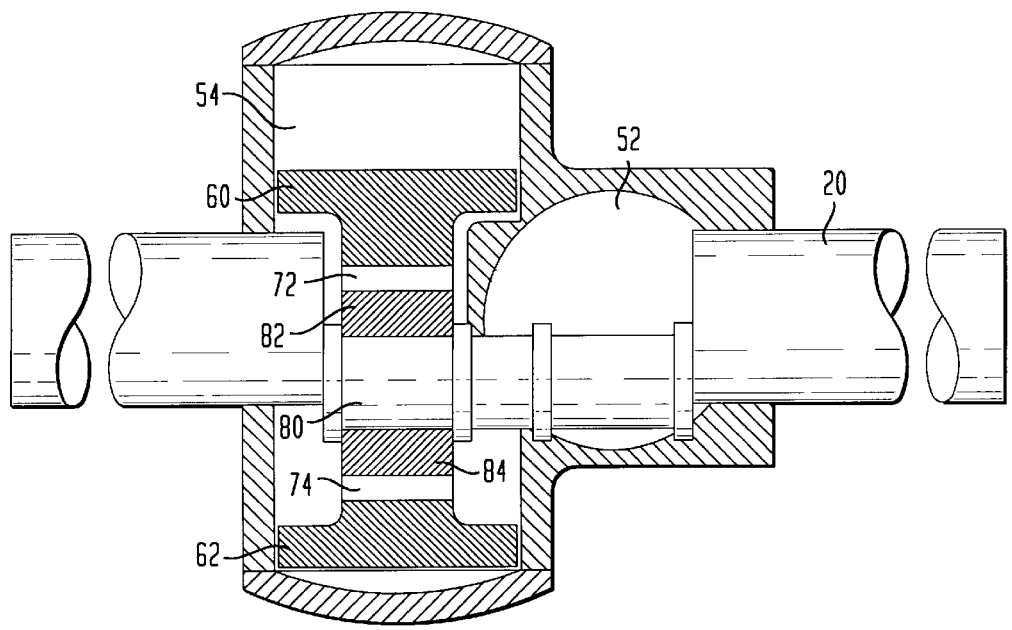
FIG. 5 is a cross-sectional view of the pedal engine/wheel motor of FIG. 2 taken along section line V—V and looking in the direction of the arrows.

FIGS. 3, 4 and 5 show the internal components of a pedal engine 22 in accordance with the present invention. The wheel motor 28 may have the exact same configuration and for the purposes of the following description is assumed to be the same as the pedal engine 22. Whereas many different types of positive displacement pumps can be employed as the pedal engine 22 and/or the wheel motor 28, the embodiment of the present invention depicted in FIGS. 3, 4 and 5 is that of a pump using a unique motion translator invented by the present inventor herein and entitled a "conjugate drive" type motion translator. A complete description of conjugate drive motion translators is provided in U.S. Pat. Nos. B1 5,259,256, 5,259,256, 5,351,567, 5,417,309, 5,445,039 and 5,456,159, such patents being incorporated herein by reference for their teachings regarding conjugate drives. Both the pedal engine 22 and the wheel motor 28 employ conjugate drive positive displacement pumps in the embodiment of the present invention depicted in FIGS. 3, 4 and 5.

The conjugate drive is a new, mechanical, linear-to-rotary or rotary-to-linear motion conversion device with considerable advantages over conventional connecting rod, scotch yoke, and other standard mechanisms. The conjugate drive is a compact design which has less inertia, bearing loads, and structural weight than standard mechanisms and uses a rigid structure to transfer forces through wave-shaped interface surfaces allowing for a pure rolling motion with continuous contact. The waved-shaped interface surfaces provide for a wide range of unique, highly flexible, dynamic piston motion controls. These motions allow the conjugate drive to optimize the input force and increase mechanical efficiencies. As a fluid pump, the conjugate drive can be effectively used as an alternative transmission for a typical bicycle. The conjugate drive bicycle transmission is, at minimum, comparable to the typical chain-drive bicycle transmission, and in most respects, is significantly better than the standard chain-drive. Those areas include: (1) equal or lighter weight; (2) equivalent cost; (3) decreased operational noise; (4) easier maintenance; (5) greater reliability; (6) greater mechanical efficiency in the real user environment; (7) exhibits improved biomechanical efficiency to optimize leg muscle power profile in training; (8) eliminates chain backlash and (9) provides a smooth, infinitely variable speed control shift for speed control.

As noted above, the relative volumetric capacity of the pedal engine 22 and wheel motor 28 will determine the ratios available for driving the bicycle. One can note that the pedal engine 22/wheel motor 28 depicted in FIGS. 3 and 5 has four cylinders 52*a*, 52*b*, 54*a*, 54*b* with a block having a pair of skewed, perpendicularly oriented cylinder bores 52, 54. The cylinder bores 52, 54 slideably receive a pair of mating double-ended piston assemblies 56, 58 (shown in phantom) therein. The double ended piston assemblies 56, 58 are composed of a pair of pistons 60, 62 and 64, 66 joined by a connective open web 68, 70, respectively. While the piston assemblies are described as being composed of multiple parts for the purposes of explaining the invention, they may be formed as a single forging or casting, if desired. The webs 68, 70 each receive a corresponding pair of conjugate bearings 72, 74 and 76, 78, respectively, affixed thereto. A crankpin 80 rotates with the shaft 20 at a fixed offset or throw. In the wheel motor 28, the motor block 34 rotates about the crankshaft 32, which is fixed. A pair of conjugate drivers 82, 84 and 86, 88 are disposed between the crankpin 80 and the conjugate bearings 72, 74 and 76, 78, respectively.

FIG. 4 illustrates an embodiment of the present invention wherein the conjugate bearings 76 and 78 are formed monolithically in the web 70. Pistons 64 and 66 may also be integrally formed with the web 70.

As the crankpin is turned through each 360 degree rotation, the conjugate drivers 82, 84 and 86, 88 engage the conjugate bearings 72, 74 and 76, 78 transferring crankpin motion to the double-ended piston assemblies 56, 58. For the purpose of explaining the present invention, however, it can be noted that the conjugate drive provides an efficient and durable rotary-to-linear motion interconverter that augments the pumping action of both the pedal engine 22 and the wheel motor 28.

Given the cylinder configuration illustrated in FIGS. 3, 4 and 5, it can be appreciated that each piston assembly 56, 58 will oscillate between a pair of extreme positions for each rotation of the crankshaft. Since the double ended piston assemblies 56, 58 divide each cylinder bore 52, 54 into a pair of cylinders, viz., 52a, 52b and 54a, 54b, respectively, having opposite directionality, the piston assembly position at the first extreme position corresponds to top piston position for the first cylinder and bottom piston position for the other. Conversely, at the other extreme position, the first cylinder is at bottom piston position and the other is at top piston position. In this sense, the cylinders 52a, 52b, 54a, 54b defined by each piston assembly are complementary, i.e., when one is on the intake stroke, the other is exhausting and vice versa. It is necessary that the output volume of the pedal engine equal the input volume because the system is closed and the volume of fluid output must be accommodated by the input stroke of its complementary cylinder. The same can be said of the wheel motor. While a four cylinder pedal engine is depicted, the number of cylinders can be any multiple of two.

FIGS. 6A–6C show the operation of the present invention diagrammatically. The wheel motor 28 may have the exact same configuration as the pedal engine 22 and, for the purposes of the following description, both may be assumed to be identical.

A source of motive power actuates the engine 22. In the bicycle embodiment shown in FIG. 1, the source of power is the rider acting through the pedals 12, 14 and the pedal arms 16, 18. Of course, it is not required that the power source be a human; an internal combustion, electric or steam engine could be employed. As a further alternative, a supplementary power source such as an electric motor, Stirling engine, compressed air cartridge, etc. coupled to a pump could be employed to assist a human in powering the vehicle. Whereas most conventional sources of power will communicate their power via a rotating output shaft, a reciprocating output, such as a piston drive shaft or a fluid under pressure would also be applicable for coupling the power source to the engine 22. As with the power source, the engine 22 shown in the embodiment of FIG. 1 may have a rotating shaft for converting the rotary motion of the power source into motion of the fluid displacement apparatus constituting the engine 22. It should be noted that the engine 22 has been denominated such due to its relationship to the fluid motor 28 because the engine 22 is the more active element, with the motor 28 responding to the output of the engine.

Given an engine 22 that is suitable for displacing fluid when actuated by a source of motive power P, the first mode of operation as shown in FIG. 6A can be achieved. Namely, when valves 46 and 50 are closed, shunt passages 44 and 48 are blocked. Fluid output from the engine 22 is therefore directed in its entirety by feeder conduit 40 to the fluid motor 28. The fluid passes through the motor 28 inducing a mechanical output which is coupled to an output mechanism, e.g., 36, in the embodiment depicted in FIG. 1, a wheel. While a wheel is depicted as the output mechanism, the present invention could be utilized to turn a shaft leading to a rear wheel differential, a propeller, or any other mechanism.

The relative volumetric capacities of the engine 22 and motor 28 determine the drive ratios available. Upon exiting the fluid motor 28, the fluid is returned via the return conduit 32 to the inlet side of the engine 22 where it is again passed through the engine under the impetus of the power source. In the mode of operation depicted in FIG. 6A, the engine 22 is turning the motor 28 at the lowest possible engine rpm-to-motor rpm ratio.

FIG. 6B shows another mode of operation, wherein the motor 28 is overrunning the engine 22. This can occur if the driven element, due to inertia or some other force, turns the motor 28 at a rate such that the motor fluid output exceeds that produced by the fluid engine 22. As noted above, this condition occurs during operation of a bicycle when the operator stops pedaling and coasts. When motor 28 fluid displacement exceeds that of engine 22, the feeder conduit 40 becomes depressurized and the return conduit 42 is pressurized. This pressure differential can be utilized to control a valve 46 through the shunt passageway 44 such that the fluid excess produced by the motor 28 can be conducted through the passageway 44 back to the feeder conduit 40 and into the motor 28 inlet. Without the shunting depicted in FIG. 6B, the hydraulic linkage between the engine 22 and motor 28 could prevent the motor 28 from being actuated without a corresponding actuation of the engine 22.

FIG. 6C depicts a third mode of operation for the present invention wherein valve 50 controlling shunt passageway 48 is opened, allowing pressurized fluid to pass from the feeder conduit 40 to the depressurized return conduit 42 and into the intake side of the engine 22. Since a portion of the fluid output of the engine 22 is diverted through shunt passageway 48, the volume of fluid reaching the motor 28 is reduced, reducing the corresponding mechanical displacement of driven member 36. In this manner, the ratio of engine 22 rpm-to-motor 28 rpm can be controlled, with the maximum valve 50 opening corresponding to the greatest engine 22 turn-to-motor 28 turn ratio.

In order to function as a pump, the engine 22 and the wheel motor 28 must be valved to the conduits of the manifold 38 such that a uni-directional flow is established, i.e., on the input stroke, the pedal engine must communicate with the return conduit 42. On the output stroke, the pedal engine must be in fluid communication with the feeder conduit 40. The wheel motor works the same way but with the manifold correlations reversed. The principles and methods used to provide valving for pumps have been well explored and are within the understanding and working knowledge of the normally skilled artisan in the field of pumps. Accordingly, a specific valving arrangement is not shown, but could include, e.g., cam actuated poppet valves, reed valves, spring biased poppet valves, disc valves, etc., all as commonly known in the art.

FIG. 7 shows the same basic apparatus as described above, but in addition, a brake valve 90 has been inserted into the return conduit 42. The brake valve can be implemented using any known valve mechanism, such as a poppet valve, gate valve, ball valve or disc valve, and restricts the flow from the wheel motor 28 when closed (brake applied). Closure of the brake valve creates hydraulic backpressure that restricts the wheel motor from displacing fluid. As with the application of brakes generally, it is typically desirable to apply the braking force gradually. The present invention accommodates gradual braking via the gradual closure of the brake valve. Whereas the brake valve 90 is shown in the return conduit in FIG. 7, it could also be placed in the feeder conduit 94 (phantom) or within the fluid transfer passageways of the wheel motor itself 92 (phantom). The phantom views of the brake valve 92, 94 are therefore intended to depict alternate arrangements for the placement of brake valve 90.

Referring back to FIG. 3, a brake valve 92A may be provided in a fluid passageway between the cylinders 52, 54 or in the exterior casting of the wheel motor, as shown by valve 92B (recalling that the wheel motor 28 may be configured like the pedal engine 22 depicted in FIG. 3). It should be appreciated that placement of the brake valve 92A or 92B in the pedal engine 22 would not be efficacious. Further, it is known that brake operation can be controlled by antilock systems (ABS) which may be applied to the brake system of the present invention.

As can be appreciated, the working fluid or power transfer agent has to meet a conflicting set of criteria, viz., it should be selected to provide minimal internal friction while at the same time reducing the friction between moving parts of the apparatus and protecting moving parts from excessive wear. An additional design objective bearing upon the selection of working fluid is the size of the pedal engine 22 and wheel motor 28. In general, it is desirable to select the smallest engine/motor combination that can stand the stresses placed upon it. In this manner, working fluid volume is decreased and energy losses due to moving the working fluid are reduced. The working fluid, however, may present boundaries to miniaturization if the stresses set up in the engine 22 and wheel motor 28 exceed the ability of the working fluid to protect moving parts from unacceptable wear. Given that the power transmitted from the rider to the rear wheel will be less than 2 horsepower, light weight lubricating oils of viscosities from 5 W to 10 W are suitable as the working fluid.

Whereas, the previous examples of working fluid have described a fluid which is liquid at room temperature, the working fluid can be gaseous at room temperature and pressure. For example, air, nitrogen, argon or helium can be employed as the working fluid, either in an uncompressed state, i.e., at atmospheric pressure, or compressed at elevated pressures. Gaseous working fluids decrease the fluid viscosity and internal friction of the fluid, as well as substantially reducing its mass and inertia. Unlike liquids, however, gaseous fluids are compressible and do not provide protection against mechanical friction. A double or multiple fluid combination can be employed as the working fluid, each fluid having its own unique function. For example, a liquid lubricant can be added to gaseous fluids to prevent friction. The transfer agent or working fluid may be under the influence of pressure or vacuum or both. A partially uncompressed gaseous fluid transfer medium permits the wheel motor to be used as a heat engine if desired. For example, a source of heat could be applied to fluid within the wheel motor to assist in the filling (in this instance by expansion) of the wheel motor fluid displacement volume, e.g., cylinder in a piston/cylinder pump. A heat sink, e.g., a radiator could be included in the return conduit 42 to assist the heat engine operation. The transfer agent may be under th e influence of pressure or vacuum or both.

Whereas a conjugate drive type pump has been described above for both the pedal engine 22 and the wheel motor 28, it is not absolutely required that either or both of these components be conjugate drive-type mechanisms. That is, other types of known liquid and gas pumps, for example, connecting rod type piston pumps, Wankel rotary pumps, moving vane pumps, wobble plate pumps, gearrotor and gear pumps may be employed as either the pedal engine or the wheel motor in conjunction with a conjugate drive pump.

The bicycle transmission of the present invention is a completely closed loop system which is essentially maintenance free. All critical components are enclosed in housings which protect them from external contamination. While the conventional bicycle is one of the most mechanically efficient systems known in the world today, exhibiting an average 4% mechanical efficiency loss, this minimal efficiency loss is true only in a clean, laboratory environment. Actual, realistic efficiencies deteriorate drastically to loss levels well over 20% in real world application. The bicycle of the present invention provides an average 6% loss in the laboratory and maintains that same efficiency level during actual riding conditions. There are no additional losses from environmental contaminants. As a result, the present invention provides a "real" increase in performance as an alternative transmission for the typical bicycle frame.

While the above-described mechanism provides input to output ratio control via a variable, controlled slip, in the manner of a clutch or torque converter, it is desirable for the transmission to include a mechanism for providing a positive ratio control to provide mechanical advantage without slip. The present invention accomplishes this objective through a variable stroke crankshaft that is adjustable while the apparatus is in use or dynamically, as described below.

Figure 8:
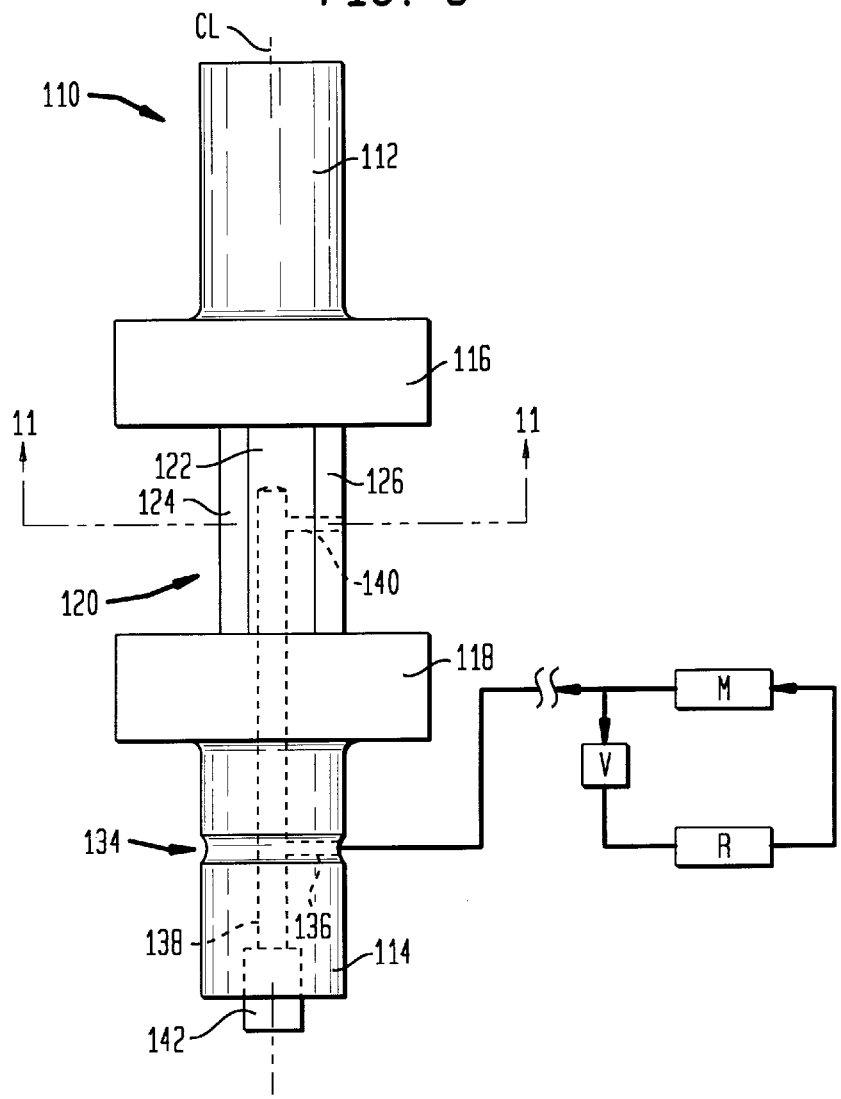
FIG. 8 is a plan view of a crankshaft for use in the pedal engine/wheel motor of FIGS. 1–5.

FIG. 8 shows a crankshaft 110 having a pair of opposing shafts 112, 114. The shafts 112, 114 are affixed to main bearing journals 116 and 118, respectively. A crankpin 120 connects the two main bearings 116, 118. The crankpin 120 shown in FIG. 8 is multifaceted, as can be more fully appreciated from the perspective shown in FIG. 10, and has a flat top face 122, a rounded rear surface 124, and a rounded front surface 126. A flat bottom surface 128 of the crankpin 120 is not visible in FIG. 8, but can be seen in FIG. 10. The crankpin 120 of the present invention is unconventional in that it is not cylindrical and does not directly interact in a coaxial sliding manner with another mechanical element, such as a connecting rod. Rather, the present invention utilizes an intermediate, hydraulically actuated crankpin shell with an internal hollow (active bearing member) 130 (see FIG. 13) to interact with a cooperating mechanical link, such as a connecting rod, roller or block bearing as shall be explained below. The crankshaft 110 is provided with passageways or galleys for conducting an hydraulic actuating fluid, such as a lightweight oil, which is supplied under pressure from a source of hydraulic fluid M (master cylinder) to the crankshaft 110 via an annular groove 134 in one of the shafts 112, 114. The crankshaft 110 of the present invention would typically be utilized in a crankcase or block equipped with bearing shells and a pressurized lubrication system. In the alternative, ball or roller bearings could be employed to support the crankshaft. A similar arrangement of close tolerance bearing shells and seals and/or a stuffing box arrangement is preferably employed to provide a separate sealed system to supply pressurized hydraulic fluid to groove 134 which communicates with a radial galley 136 for supplying hydraulic fluid to an axial main galley 138 and from there to the surface 126 of the crankpin 120 via a crankpin galley 140. As is conventional, the internal galleys in the embodiment depicted are drilled in the crankshaft. In the embodiment shown, the main galley 138 is plugged by plug 142. In another alternative, pressurized hydraulic fluid could be supplied to the main galley 138 via an opening in the end of the shaft 114, e.g., via a connection at the opening sealed by plug 142.

Figure 9:
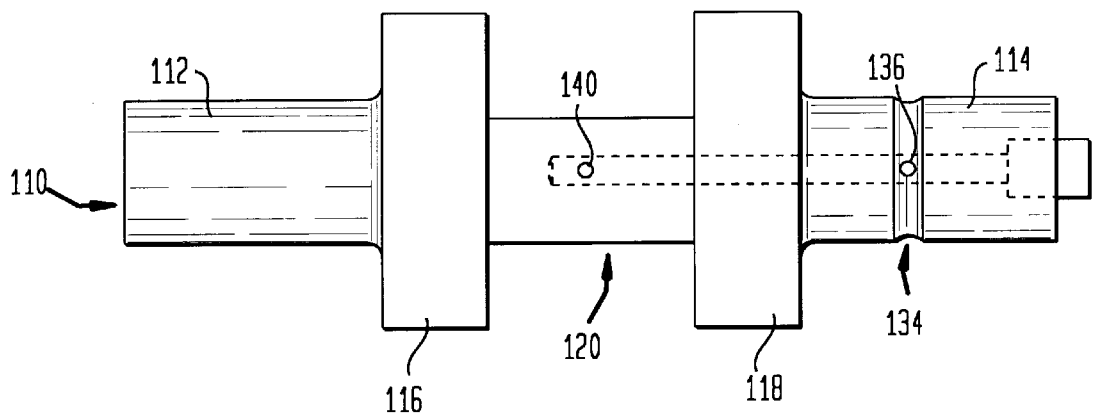
FIG. 9 is a side view of a crankshaft of FIG. 8.

FIG. 9 shows the same basic features as FIG. 8 except that the entrances to the radial crankpin galley 140 and radial supply galley 136 are visible in this view. It is also important to observe that the crankpin 120 in FIG. 9 is symmetrically disposed along the axis of the crankshaft 110. In contrast, the plan view of FIG. 8 shows the crankpin 120 being axially offset to the right.

Figure 10:
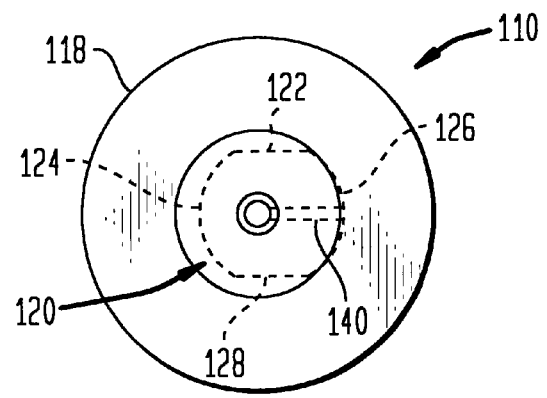
FIG. 10 is a front view of the crankshaft shown in FIGS. 8 and 9.

FIG. 10 also illustrates the above-mentioned asymmetry with respect to the position of the crankpin 120 which is shown in phantom. FIG. 10 also illustrates that the crankpin 120 has flattened surfaces 122 and 128 and rounded portions 124 and 126. The significance of this cross-sectional shape is its interaction with the active bearing member 130 (see FIG. 13) as shall be described below. In FIG. 10, the crankpin 120 and radial crankpin galley 140 are shown in phantom.

Figure 11:
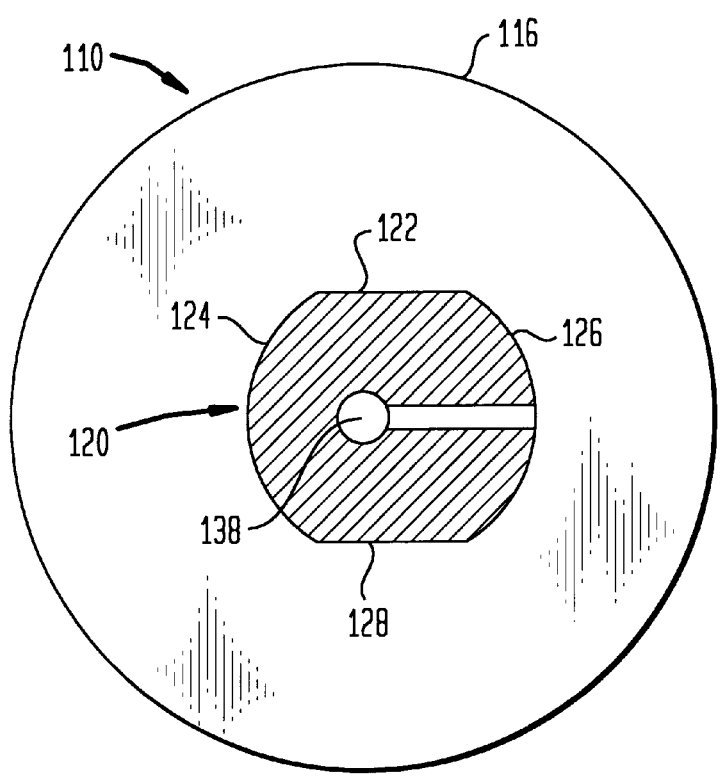
FIG. 11 is a cross-sectional view of the crankshaft of FIG. 8 taken along section lines XI—XI and looking in the direction of the arrows.

The cross-sectional view of the crankpin 120 shown in FIG. 11 illustrates that the crankpin 120 has a symmetrical shape and is offset from the axis of the crankshaft 110. This can be most easily appreciated by observing the position of the main axial galley 138, which is coaxial with the crankshaft 110, as well as the shafts 112, 114 and the main bearings 116, 118 (see FIG. 1). Upon comparing the distance between the surfaces 124 and 126 and the axial galley 138, it is apparent that the crankpin 120 is offset to the right of crankshaft center line CL (see FIG. 1).

Figure 12:
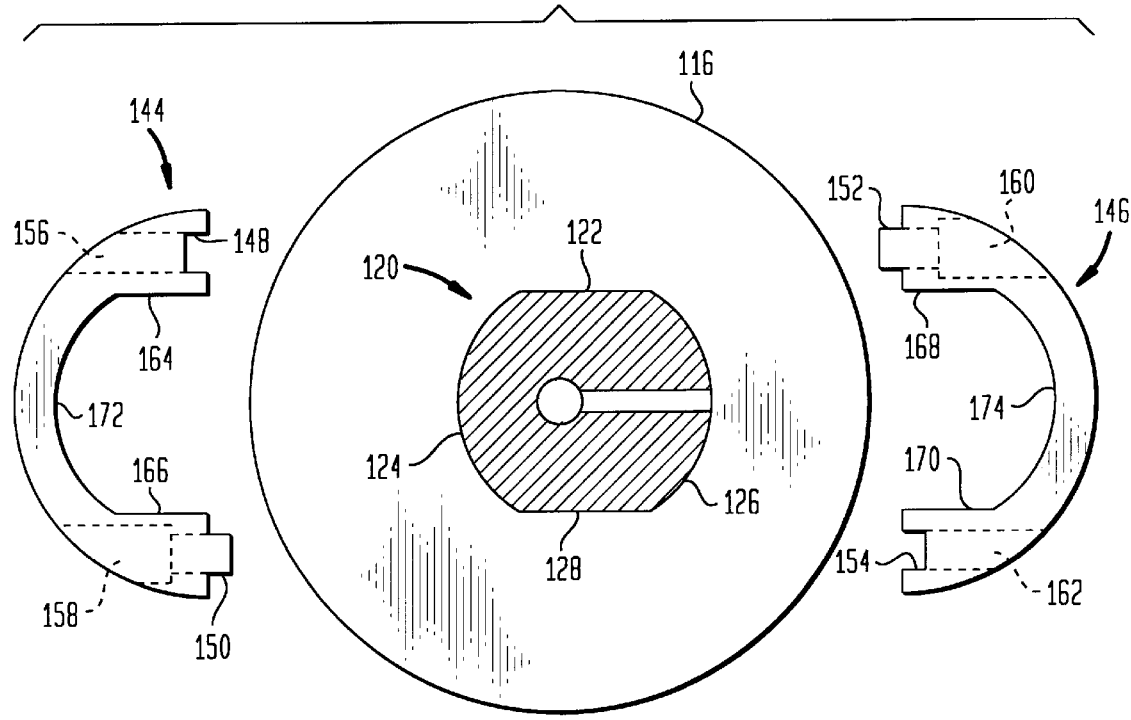
FIG. 12 is the crankpin of FIG. 11 with a pair of active bearing member segments shown exploded away from the crankpin.

FIG. 12 shows the active bearing member 130 of the present invention which is composed of a pair of mating active bearing member segments 144 and 146. The active bearing member segments 144, 146 have complementary mating structures 148, 150 and 152, 154, respectively, which may take the form of mating dowels and holes or any other form of projection and mating recess to positively locate the active bearing member segments 144, 146 relative to each other. Each of the active bearing member segments 144, 146 has apertures 156, 158 and 160, 162, respectively, (shown in phantom) for accommodating a bolt or other connector for clamping the mating active bearing member segments 144, 146 tightly together. Each of the active bearing member segments 144, 146 has a pair of flat surfaces 164, 166 and 168, 170, respectively, for slidably embracing the corresponding flat surfaces 122, 128 of the crankpin 120. Further, each of the active bearing member segments 144, 146 has curved surfaces 172 and 174 sized and shaped to fit snugly against surfaces 124, 126, respectively, of the crankpin 120. For instance, in FIG. 13, the surface 174 of the active bearing member segment 146 fits against the surface 126 of the crankpin 120, while in FIG. 16, the surface 172 of the active bearing member segment 144 fits against the surface 124 of the crankpin 120. While the foregoing is an efficient configuration, the present invention does not require complementary shapes for surfaces 172, 174 and 124, 126. Furthermore, while generally arcuate surfaces 172, 174, 124, 126 are shown in, e.g., FIG. 13, such surfaces need not be arcuate but could assume any desired contour. For instance, the surfaces 172, 174 and the surfaces 124, 126 can be flat.

Figure 13:
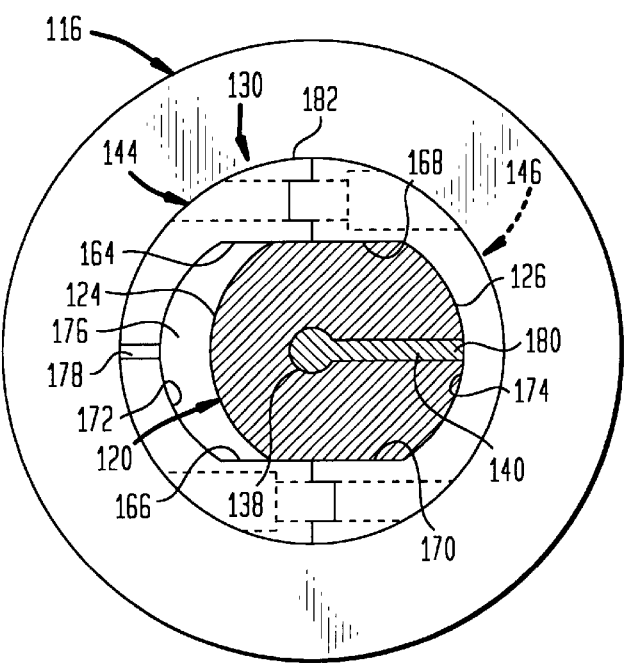
FIG. 13 is the crankpin and active bearing member segments of FIG. 12 in an assembled configuration and at a first crankpin bearing offset, namely, zero offset.

FIG. 13 shows the active bearing member segments 144, 146 assembled together around the crankpin 120. As can be appreciated, when the active bearing member segments 144, 146 are assembled together, they form a space therebetween defined by the internal surfaces 164, 166, 168, 170, 172, 174. More particularly, the space is sized and shaped so as to allow the active bearing member surfaces 164, 168 and 166, 170 to slide along the surfaces 122 and 128, respectively, of the crankpin 120 over a limited range of travel toward and away from the crankshaft center line (see FIG. 8). When the active bearing member 130 is displaced, as in FIG. 13, to its limit of travel in a leftward direction, a chamber 176 is formed between the interior surface 172 of the active bearing member segment 144 and the curved surface 124 of the crankpin 120. This chamber 176 may be vented by a vent 178 in order to express air and/or hydraulic fluid, as shall be explained below. As noted, the active bearing member 130 is in its left-most position in FIG. 13, such that the surface 126 of the crankpin 120 is proximate to or in contact with the interior curved surface 174 of the active bearing member segment 146. Hydraulic fluid 180 is shown filling the main axial galley 138 and the radial crankpin galley 140. In the present invention, exterior surface 182 of the active bearing member 130 is cylindrical in shape and is preferably machined and polished to serve as a suitable bearing/journal surface. The exterior surface 182 of the active bearing member 130 is analogous to the exterior surface of a conventional crankpin and receives the articulated member of the mechanical movement which interacts with the crankpin, e.g., the large end of a connecting rod. It can thus be appreciated that as the crankshaft 110 is turned, the crankpin 120 will revolve about the crankshaft axis at a fixed angular orientation as defined, e.g., by an axis of symmetry. The active bearing member 130 will revolve conjointly with the crankpin 120 at the same angular orientation, that is, with the flat surfaces 122, 128 of the crankpin 120 closely engaging the flat surfaces 164, 166, 168, 170 of the active bearing member 130. Accordingly, the active bearing member 130 does not rotate relative to the crankpin axis.

Figure 14:
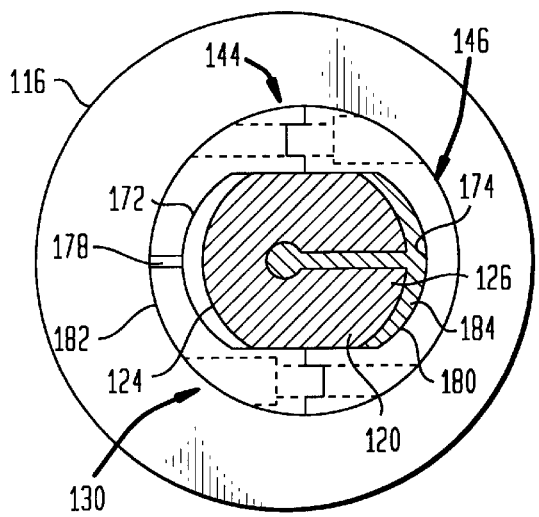
FIGS. 14–16 show the crankpin and active bearing member segments of FIG. 13 at three sequentially larger crankpin bearing offset positions.

FIG. 14 illustrates that the active bearing member 130 can be radially displaced hydraulically via pressurized hydraulic fluid 180 which is pumped between the curved surface 126 of the crankpin 120 and the interior curved surface 174 of the active bearing member segment 146, thereby creating a chamber 184 filled with hydraulic fluid 180. The volume of hydraulic fluid 180 forced into the chamber 184 determines the crankpin bearing offset (or radial displacement). Referring back to FIG. 13 briefly, one can note that in its left-most position (zero radial displacement), the outer surface 182 of the active bearing member 130 is coaxial with the main bearing 116. In this position, the crankshaft (crankpin) stroke is zero. In FIG. 14, the active bearing member 130 is offset (radially displaced), resulting in a total stroke equal to two times the offset. A connecting rod attached to the outer surface 182 of the active bearing member 130 would be displaced by the rotation of the crankshaft 110, i.e., it would trace a circle of radius equal to the offset. In a typical piston/cylinder/connecting rod/slider crank arrangement, the active bearing member offset of FIG. 14 would generate reciprocating linear piston displacement equal to the stroke upon crankshaft rotation.

Figure 15:
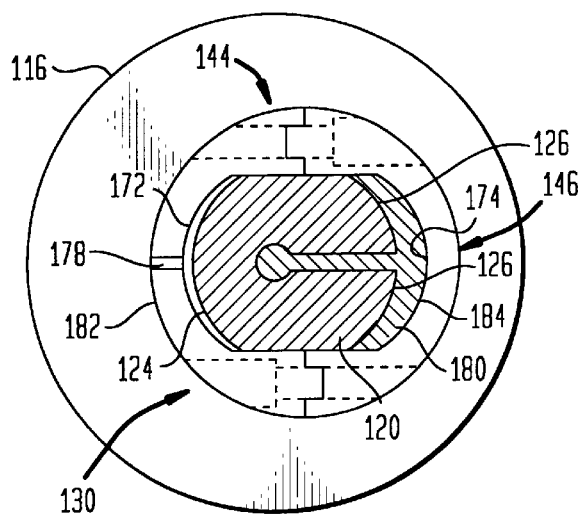
Figure 16:
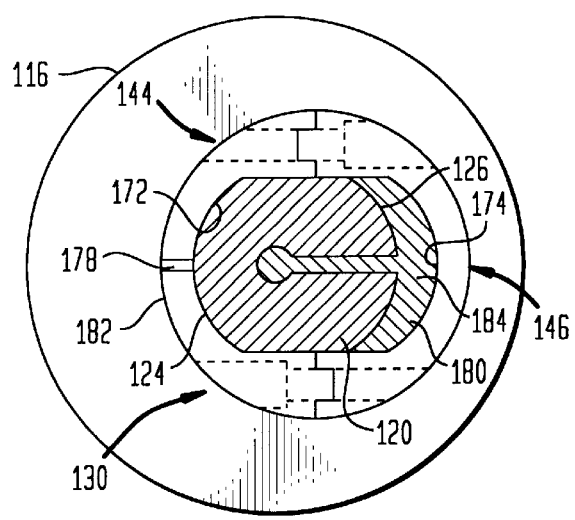

FIGS. 15 and 16 show greater active bearing member offsets leading to larger crankshaft strokes and larger displacements, e.g., of a crankshaft/connecting rod articulated reciprocating piston. For instance, FIG. 16 shows the active bearing member 130 in its maximum displacement position and hence the greatest active bearing member offset. In this position, the surface 172 of the active bearing member segment 144 is proximate to or in contact with the surface 124 of the crankpin 120.

As can be appreciated by those of normal skill in the art, the crankshaft of the present invention has numerous applications in a variety of mechanical movements. In a hydraulic pump or compressor, the variable stroke achievable with the adjustable crankshaft of the present invention would permit a variable output from the pedal engine 22 and/or variable input for the wheel motor 28. In addition, the torque/volume relationship achievable due to a variable stroke can be used to match torque to the power/speed requirements of a mechanical movement. Because the displacement of the active bearing member can be regulated over an infinite range from zero to the limit of travel of the active bearing member, the stroke is infinitely variable in accordance with the hydraulic positioning of the active bearing member. For this reason, the crankshaft 110 of the present invention can be utilized to provide an infinitely variable hydraulic transmission. The adjustable stroke crankshaft of the present invention is adjustable while the crankshaft is in use, i.e., by controlling the hydraulic fluid regulating the position of the active bearing member (stroke). As a result, the stroke of the crankshaft can be dynamically altered in order to suit torque requirements, i.e., high torque/high input/output ratios would be associated with small active bearing member displacement. As torque demand decreases, the active bearing member displacement can be gradually increased leading to progressively larger stroke and lower input/output ratios. These adjustments to crank stroke can be implemented while the crankshaft is moving (on-the-fly) and may be controlled by feedback/demand to achieve real-time control.

As can be appreciated from FIGS. 14–16, the displacement of the active bearing member 130 leading to larger crank stroke is caused and maintained by an increased volume of incompressible hydraulic fluid 180 in chamber 184. Because of inertia, a driven member, such as a conjugate driver, e.g., 82 (see FIG. 4) or a connecting rod, would resist any crankpin offset from the neutral position and would exert reactive forces tending to push the active bearing member back to a neutral or zero displacement position. In such circumstances, in order to reduce active bearing member displacement, for instance, from the displacement shown in FIG. 16 to the displacement shown in FIG. 14, some of the pressurized hydraulic fluid 180 is bled out of the chamber 184 via a release valve V (see FIG. 8) disposed in the pressurized hydraulic line that supplies chamber 184. Fluid bled out of the pressurized portion of the hydraulic system may be directed to a reservoir R disposed on the supply side of the source M of pressurized hydraulic fluid (see FIG. 8).

As depicted in FIGS. 13–16, the clearance between the surfaces 164, 166, 168, 170 of the active bearing member 130 and the surfaces 122 and 128 of the crankpin 120 must be as small as possible to inhibit fluid leakage from the pressurized chamber 184 to, for instance, the unpressurized chamber 176. Since some amount of leakage is inevitable, the chamber 176 is vented by vent 178 such that chamber 176 does not become filled with fluid that would impede repositioning the active bearing member 130. Because some leakage of hydraulic fluid from chamber 184 is expected, the present invention may incorporate sensors that sense on active bearing member displacement such that the source of hydraulic fluid controlling active bearing member position can be operated based upon feedback from the sensor . In this manner, a desired active bearing member displacement can be maintained, notwithstanding leakage of hydraulic fluid from the pressurized chamber 184.

The source M of pressurized hydraulic fluid controlling the position of the active bearing member may be a separate hydraulic pump or be bled off from the primary working fluid, i.e., the hydraulic fluid coursing through the pedal engine 22 and wheel motor 28. As can be appreciated from the foregoing, a master and slave hydraulic system can be utilized for controlling the position of the active bearing member 130. Moreover, the hydraulic active bearing member position control system can be entirely contained inside the crankshaft 110 and be equipped with an internal or remote passive/active motive control system or an external linkage/cable control system. Further, the master cylinder of the hydraulic system can be external and have hydraulic lines adapted to feed its associated internal slave chamber through active or passive intervention.

In those applications where the hydraulic displacement chamber 184 is unloaded during the cycling of the crank, e.g., at top and bottom dead center of a reciprocating piston system like that shown in FIG. 3, the vent 178 may be eliminated in favor of a completely filled chamber 176 with fluid displaced from one chamber being pumped into the other to establish a desired active bearing member position.

Figure 17:
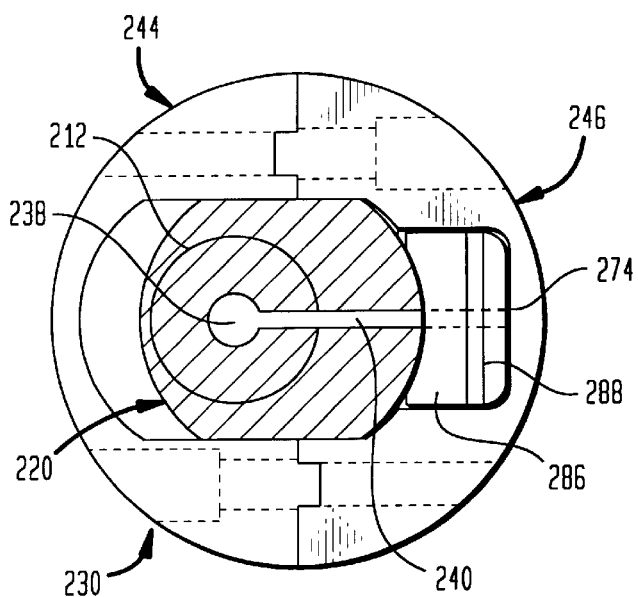
FIGS. 17–19 show a second adjustable crankshaft for use in the present invention and at three stages of crankpin offset.

FIG. 17 shows an alternative embodiment of the present invention wherein the active bearing member segment 246 includes an inner surface 274 in the shape of a cylinder for receiving a piston 286. The piston 286 may have sealing or compression rings 288 for effecting an hydraulic seal. The piston 286 may be monolithically formed with the crankpin 220 or it may be a separate element affixed by a bolt or other fastening means. The piston 286 may be cylindrical or elongated in the direction perpendicular to the plane of the drawing. Instead of a single piston/cylinder as shown in FIG. 17, a plurality of pistons/cylinders can be employed. As is known to those with skill in the art of hydraulic apparatus, a piston with seal rings can provide an extremely effective seal within a mating cylinder, such that leakage of the hydraulic fluid in pressurized chamber 284 can effectively be eliminated. FIG. 17 illustrates diagrammatically that the diameter of the shaft 212 may be smaller than that of the active bearing member 230. This oversize crankpin configuration is somewhat unconventional relative to common crankshafts wherein the crankpin is typically of similar or smaller size than the crankshaft size. The active bearing member shown in FIGS. 17–19 operates in essentially the same manner as the previously described embodiment shown in FIGS. 8–16. Hydraulic fluid pumped through the axial main galley 238 communicates with the radial crankpin galley 240 filling the space between the upper surface of the piston 286 and the inner surface 274 of the active bearing member segment 246. This can be used to displace the active bearing member 230 in an outward direction for greater crankpin offsets. In FIG. 17 the active bearing member offset is zero.

Figure 18:
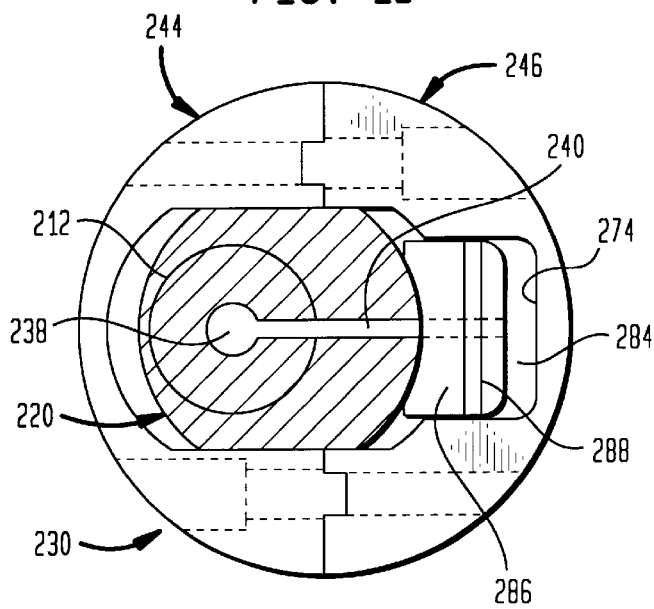
Figure 19:
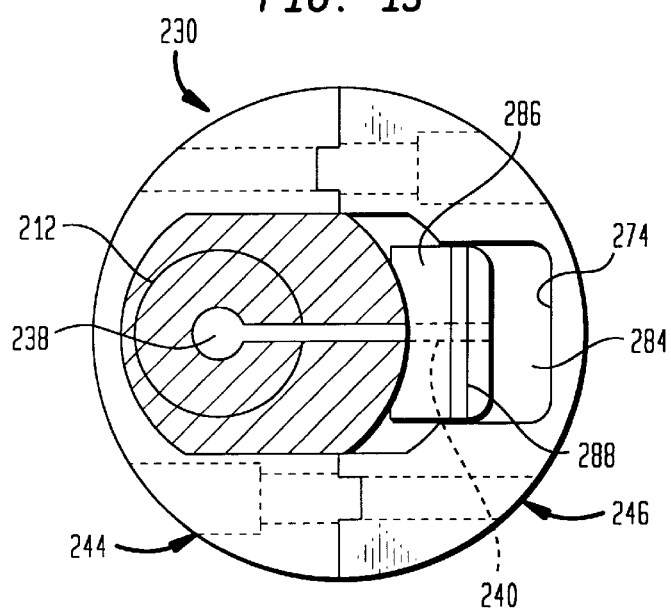

FIGS. 18 and 19 illustrate progressively larger hydraulic displacements. In order to decrease active bearing member offset, fluid filling chamber 284 can be bled off or redirected to the opposite side of the crankpin as described above.

FIGS. 20 and 21 illustrate a crankshaft assembly 310 constructed in accordance with a third alternate embodiment of the present invention. The construction and operation of the crankshaft assembly 310 of FIGS. 20 and 21 are basically the same as those of the embodiment of FIGS. 8–16, except as follows. The crankshaft assembly 310 has an oversized crankpin 320 and an oversized active bearing member 330 formed by a pair of mating active bearing member segments 344, 346. The diameter of the crankpin 320, as well as the active bearing member 330, is larger than those of opposing shafts 312, 314 and main bearing journals 316, 318 of the crankshaft assembly 310. This oversize crankpin and active bearing member configuration is somewhat unconventional relative to common crankshafts and it provides increased bearing surfaces associated with the crankpin 320 and the active bearing member 330 (e.g., the flat surfaces 322, 328 of the crankpin 320 and the exterior surface 382 of the active bearing member 330) and thereby enhances the structural integrity and load bearing capacity of the crankshaft assembly 310. Because the crankpin 320 and the active bearing member 330 are larger than the bearing journals 316, 318, the bearing journals 316, 318 do not capture the active bearing member 330 therebetween like the bearing journals 116, 118 of the embodiment shown in FIGS. 8–16. Rather, the active bearing member segments 344, 346 are assembled together along a plane perpendicular to the axis of rotation of the crankshaft assembly 310. Accordingly, the active bearing member segments 344, 346 have apertures 356, 358 and 360, 362, respectively, formed in facial surfaces 390, 392, respectively, thereof for receiving fasteners, e.g., bolts. The active bearing member segment 344 includes a pair of guide rails 394, 396 projecting from opposing flat surfaces 364, 366, respectively, and a web 398 covering a portion of a space formed between the active bearing member segments 344, 346 (see FIG. 21). Likewise, the active bearing member segment 346 includes a pair of guide rails 311, 313 projecting from opposing flat surfaces 368, 370, respectively, (see FIG. 20) and a web (not shown) covering a portion of the space. The webs 398 cooperate with the flat surfaces 364, 366, 368, 370 and the crankpin 320 to form a pressurized chamber 384 adapted to be filled with hydraulic fluid for radially displacing the active bearing member 330. The webs 398 also cooperate with the guide rails 394, 396, 311, 313 to securely position the active bearing member 330 on the crankpin 320 and therefore perform a function similar to that performed by the bearing journals 116, 118 of the embodiment shown in FIGS. 8–16. That is, the webs 398 and guide rails 394, 396, 311, 313 cooperate to inhibit the active bearing member 330 from moving longitudinally relative to the crankpin 320.

Figure 22:
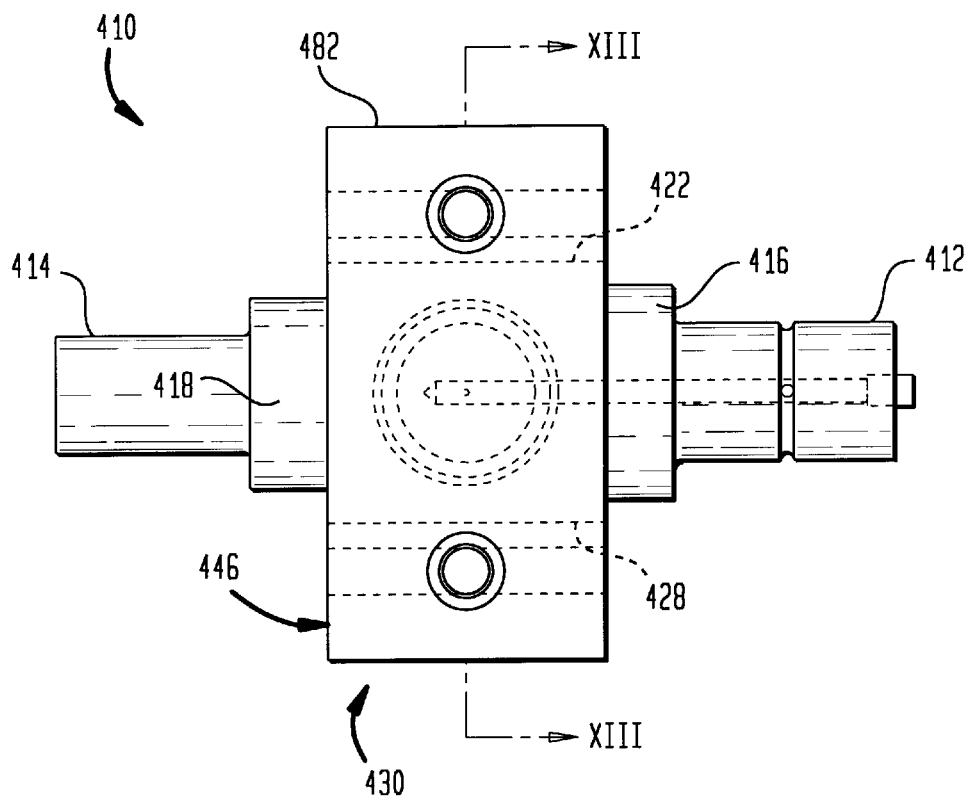
FIG. 22 is a plan view of a fourth adjustable crankshaft assembly constructed in accordance with an exemplary embodiment of the present invention.
Figure 23:
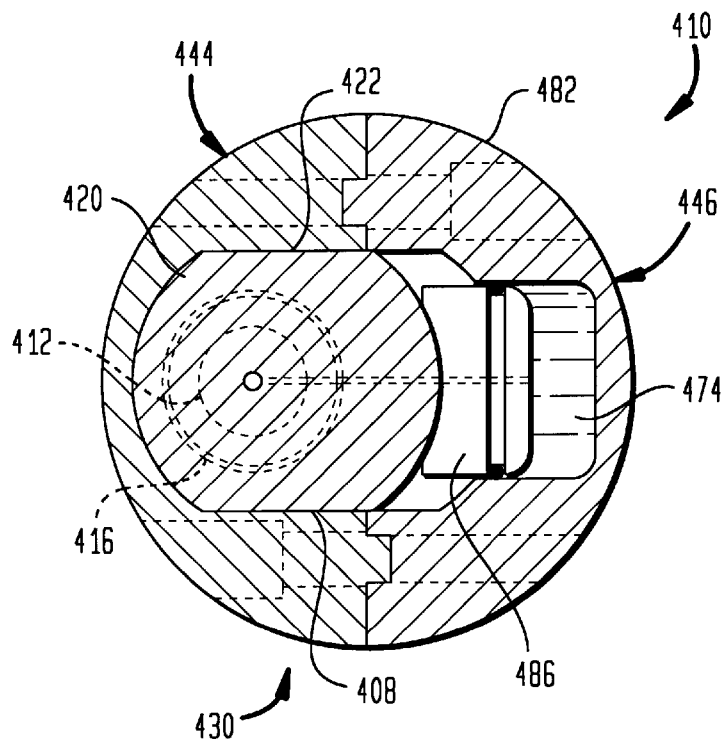
FIG. 23 is a cross-sectional view of the crankshaft assembly illustrated in FIG. 22, taken along the line XXIII—XXIII and looking in the direction of the arrows.

FIGS. 22 and 23 illustrate a fourth alternative crankshaft assembly 410 in accordance with the present invention. The construction and operation of the crankshaft assembly 410 of FIGS. 22 and 23 are basically the same as those of the embodiment of FIGS. 17–19 except as follows. The crankshaft assembly 410 has an oversized crankpin 420 and an oversized active bearing member 430 formed by a pair of mating active bearing member segments 444, 446. More particularly, the diameter of the crankpin 420, as well as the active bearing member 430 is larger than those of opposing shafts 412, 414 and main bearing journals 416, 418 of the crankshaft assembly 410. While this configuration is somewhat unconventional relative to common crankshafts, it provides increased bearing surfaces associated with the crankpin 420 and the active bearing member 430 (e.g., the flat surfaces 422, 428 of the crankpin 420 and the exterior surface 482 of the active bearing member 430) and thereby enhances the structural integrity and load bearing capacity of the crankshaft assembly 410. The crankpin 420 is provided with a piston 486, while the active bearing member segment 446 is provided with a cylinder 474 which cooperates with the piston 486 for hydraulically displacing the active bearing member 430 with respect to the crankpin 420. The piston 486 and the cylinder 474 also cooperate to inhibit the active bearing member 430 from moving longitudinally relative to the crankpin 420 during the operation of the crankshaft assembly 410. As a result, the active bearing member segments 444, 446 need not be provided with guide rails or webs similar to the guide rails 394, 396, 311, 313 and the webs 398 of the embodiment shown in FIGS. 20 and 21. Alternatively, the active bearing member 430 can be provided with guide rails and/or webs to decrease the sideloading on the piston 486 and the cylinder 474.

Figure 24:
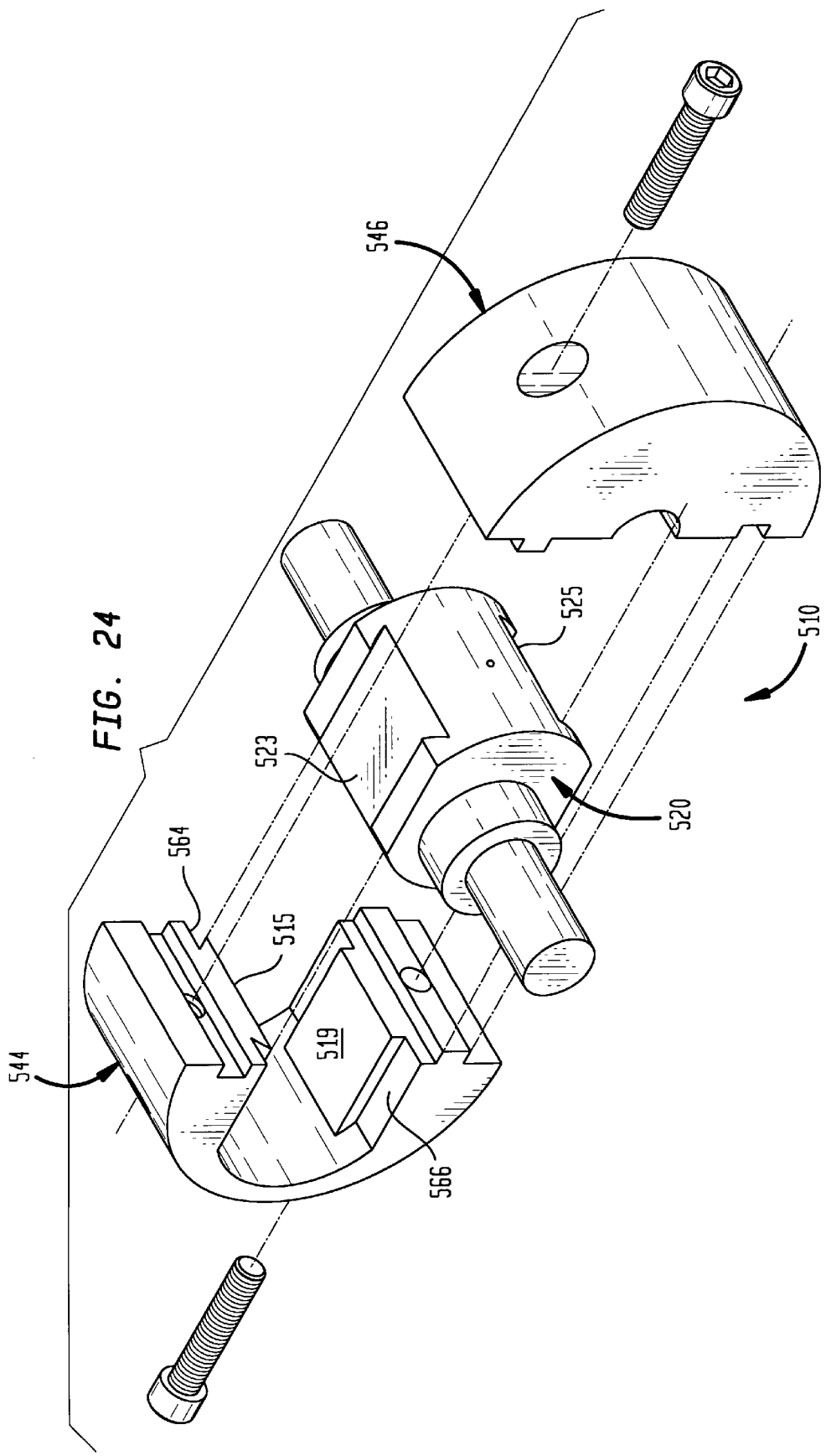
FIG. 24 is an exploded perspective view of a fifth adjustable crankshaft assembly constructed in accordance with an exemplary embodiment of the present invention.
Figure 25:
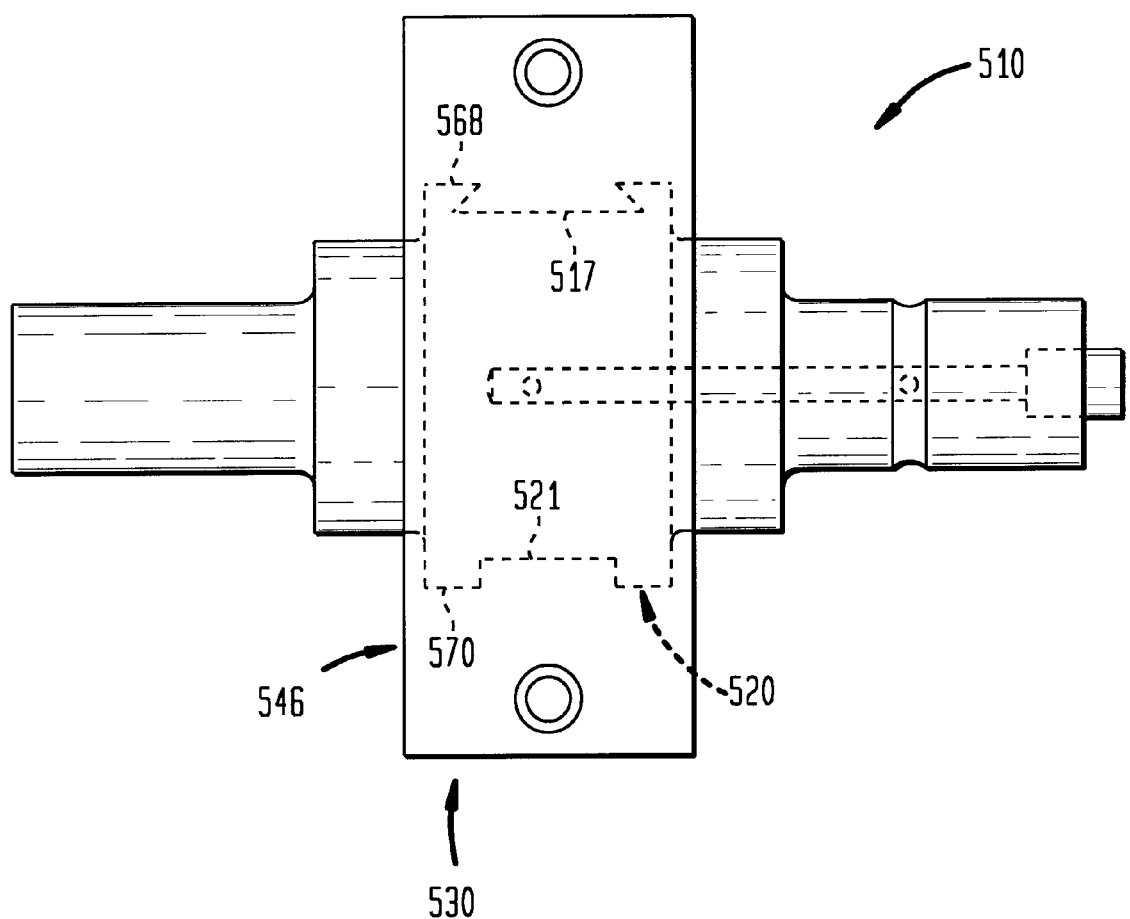
FIG. 25 is a side view of the crankshaft assembly illustrated in FIG. 24.

FIGS. 24 and 25 illustrate a fifth alternative crankshaft assembly 510 constructed in accordance with the present invention. The construction and operation of the crankshaft assembly 510 of FIGS. 24 and 25 are basically the same as those of the embodiment of FIGS. 20 and 21, except as follows. A pair of mating active bearing member segments 544, 546 are assembled together along an axis transverse to the rotational axis of the crankshaft assembly 510 to form an active bearing member 530. The active bearing member segments 544, 546 are provided with dove-tail shaped keys 515, 517 projecting from active bearing member surfaces 564, 568, respectively. The active bearing member segments 544, 546 also have box shaped keys 519, 521 projecting from opposing active bearing member surfaces 566, 570, respectively. The keys 515, 517 and the keys 519, 521 slidably engage complementarily shaped gibbed ways 523, 525, respectively, formed in crankpin 520. More particularly, as the active bearing member 530 is displaced, the keys 515, 517 and the keys 519, 521 slidably move along the gibbed ways 523, 525.

Figure 26:
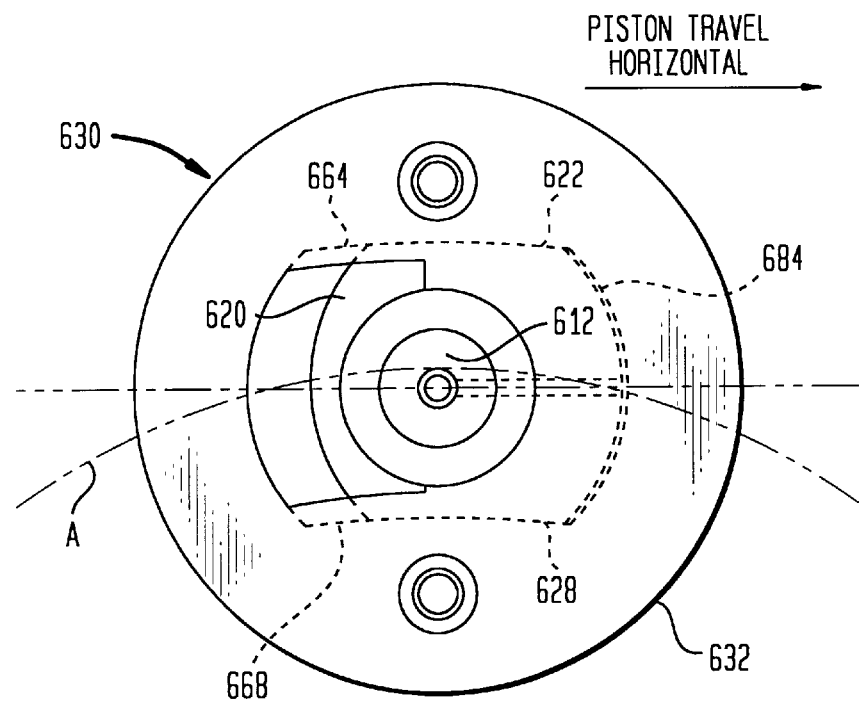
FIG. 26 is a front view of a crankshaft assembly as illustrated in FIG. 20 wherein the active bearing member travels along an arcuate path.

FIG. 26 shows an alternative embodiment of the present invention wherein the crankpin 620 outer surfaces 622 and 628 are formed concentrically with arc A. The surfaces 664 and 668 of the active bearing member 630 are curved to approximate the curved crankpin surfaces 622, 628, respectively. As a consequence, when the active bearing member 630 is displaced relative to the crankpin 612, it moves along the path of arc A. One of the beneficial attributes of this embodiment is that the arcuate surfaces 622, 628 will have a tendency to bear against mating surfaces 664, 668 when under the maximum load exerted by the articulated member. Depending upon the application, this may occur, e.g., at top dead center. The urging of the crankpin against the active bearing member surfaces 664, 668 transfers the load mechanically and/or through friction from the active bearing member 630 to the crankpin. This diverts loading of the hydraulic chamber 684 which would otherwise induce leaking of hydraulic fluid from the chamber 684 and/or would tend to push the actuating or slave piston that displaces the active bearing member to a lower displacement position via backpressure. As before, the active bearing member 630 shown in FIG. 26 is concentrically located relative to shaft 612 when in the neutral position.

Figure 27:
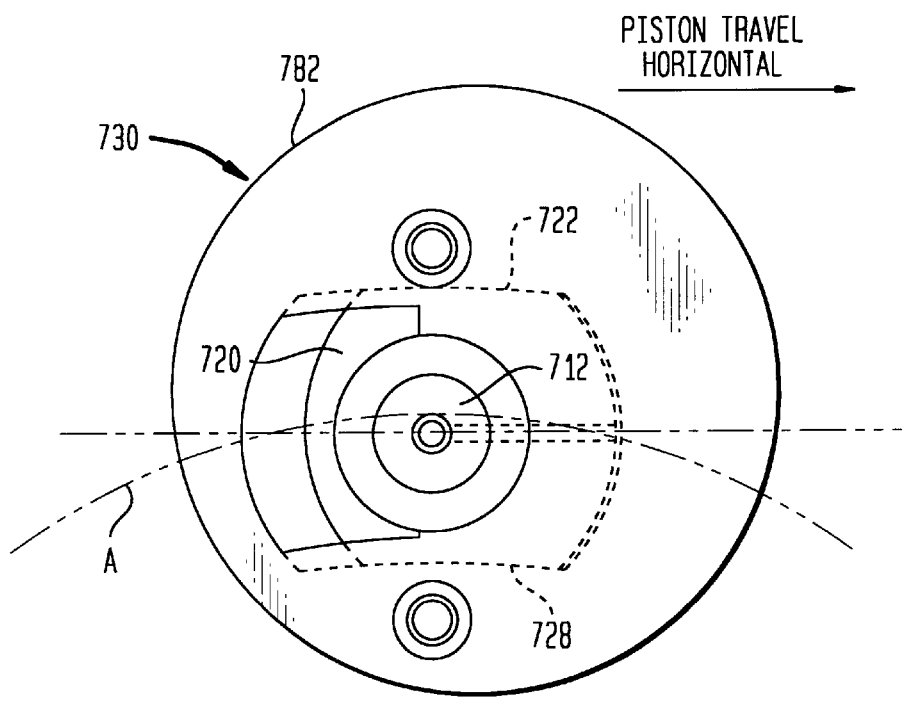
FIG. 27 is a front view of a crankshaft assembly as in FIG. 26 with the arcuate path of the active bearing member displaced eccentrically relative to the outer cylindrical surface of the active bearing member.

FIG. 27 shows an alternative embodiment of the present invention wherein the opening in the active bearing member 730 for receiving the crankpin 720 is positioned relative to the exterior surface thereof 782 such that the active bearing member 730 is eccentrically located relative to the crankpin 720 even in the fully retracted position. This results in the active bearing member 730 always having a degree of eccentricity relative to shaft 712 such that there is no neutral or zero displacement position. The embodiment of the present invention shown in FIG. 27 therefore has the capacity to have a larger maximum displacement than a crank assembly having a neutral position. Further, the shielding of the hydraulic chamber 784 from the maximum load may be enhanced by the eccentric configuration.

Figure 28:
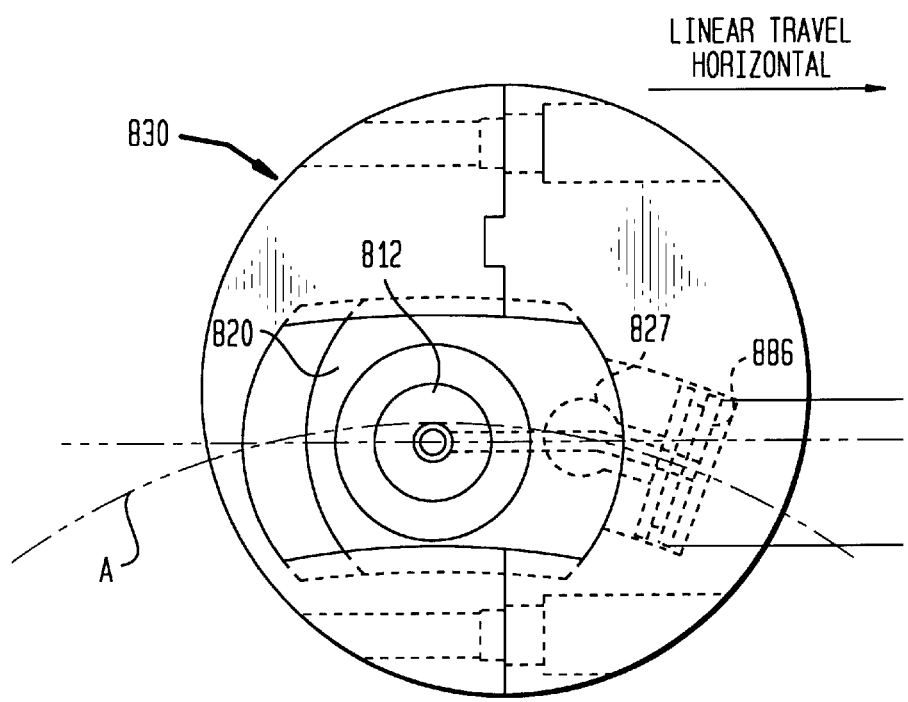
FIG. 28 is a front view of a crankshaft assembly as illustrated in FIG. 27 but incorporating a positioning piston and mating cylinder shown in phantom.

In FIG. 28, another exemplary embodiment of the present invention which includes an active bearing member 830 with an arcuate displacement path and an eccentric initial position utilizes a piston 886 traveling along arc A for positioning the active bearing member relative to the crankpin 820. A short integral connecting rod ending in a sphere projects from the piston 886 and is received within a mating socket 827 in the crankpin 820 for intermediating between the crankpin 820 and the piston 886 to determine active bearing member 830 position relative to the crankpin 820. A conventional connecting rod could also be employed.

Figure 29:
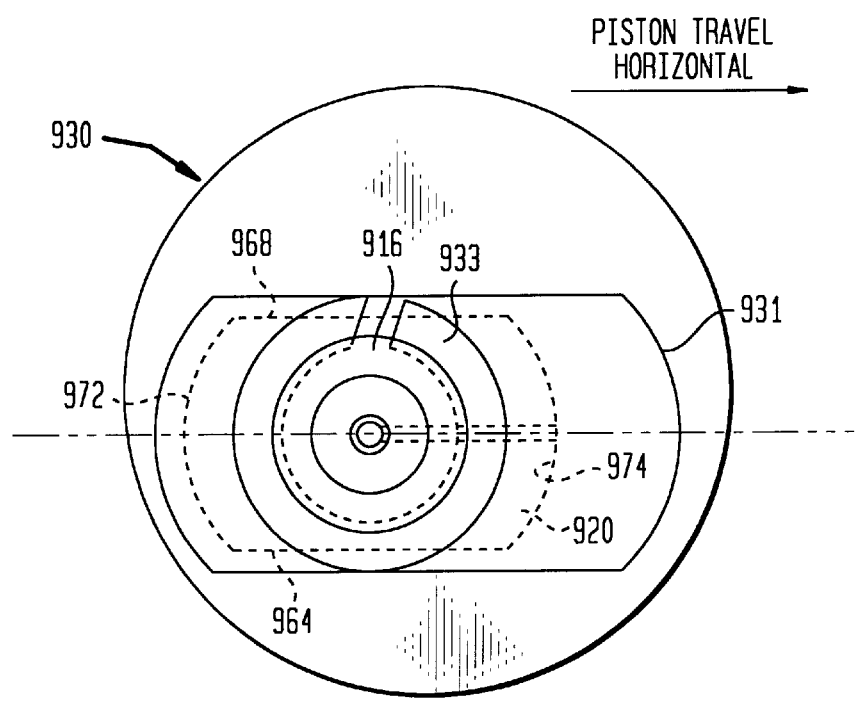
FIG. 29 is a front view of a sixth crankshaft assembly suitable for use in the present invention and utilizing a one-piece active bearing member.
Figure 30:
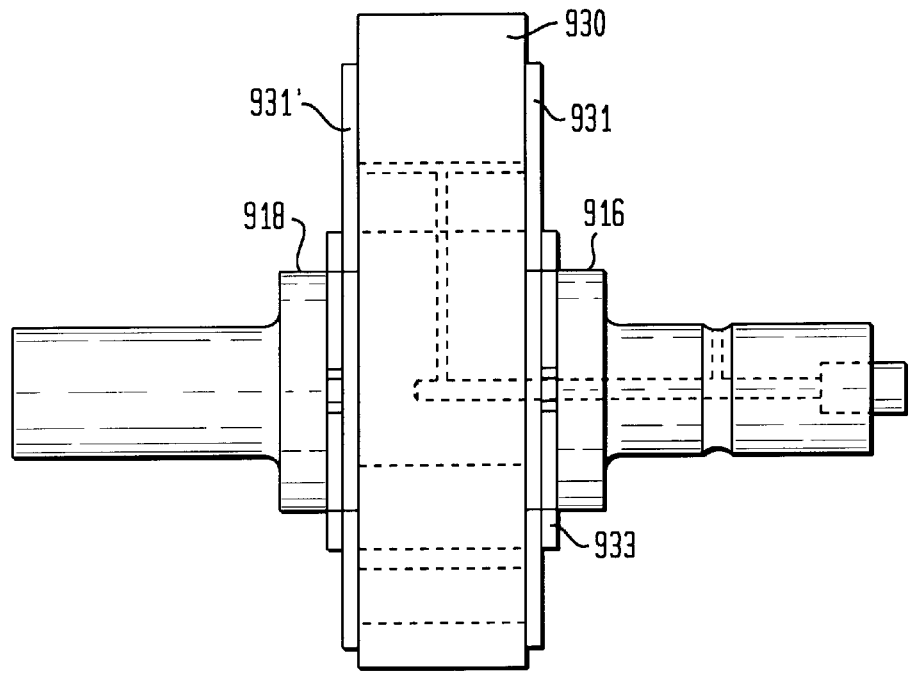
FIG. 30 is a side view of the crankshaft assembly shown in FIG. 29.

FIGS. 29 and 30 show a further alternative embodiment of the present invention wherein a one-piece or monolithic active bearing member 930 has an interior hollow (as defined by surfaces 964, 968, 972 and 974) for receiving a mating crankpin 920 therein. A pair of plates 931 and 931' (not shown) are installed over the main bearing journals 916, 918 on either side of the active bearing member 930 and are held in fluid-tight association with the active bearing member 930 by snap rings 933, 935 received in grooves in the main bearing journals 916, 918. This configuration provides a sealed hydraulic chamber divided by the crankpin 920. In the embodiment depicted in FIG. 29, the crankpin 920 is eccentrically disposed relative to the active bearing member in the zero displacement position.

Figure 31:
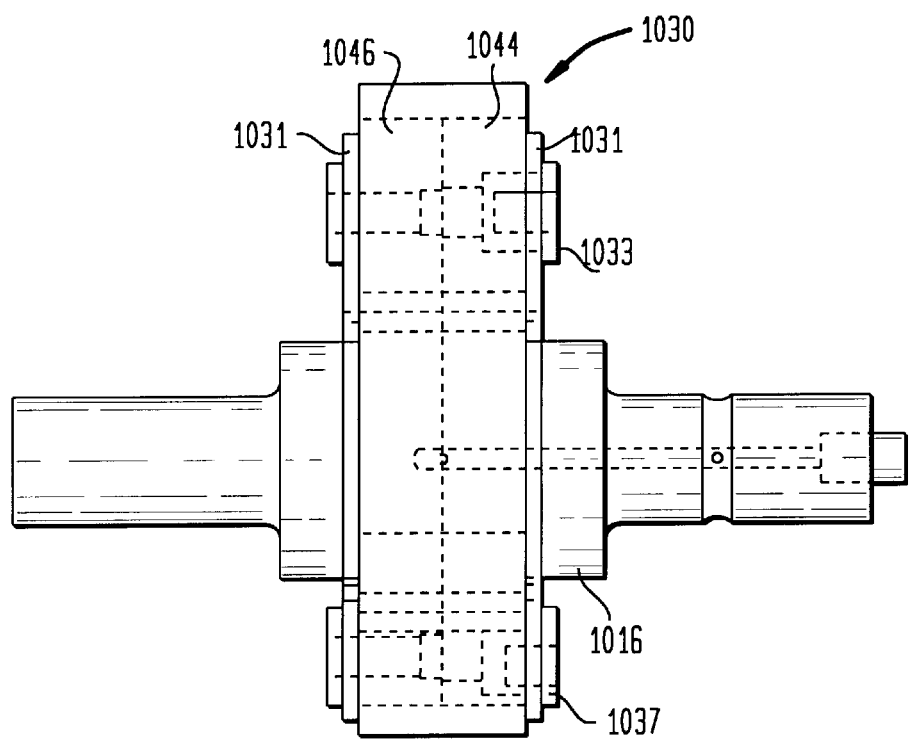
FIG. 31 is a side view of a seventh crankshaft assembly constructed in accordance with an exemplary embodiment of the present invention utilizing a composite active bearing member.
Figure 32:
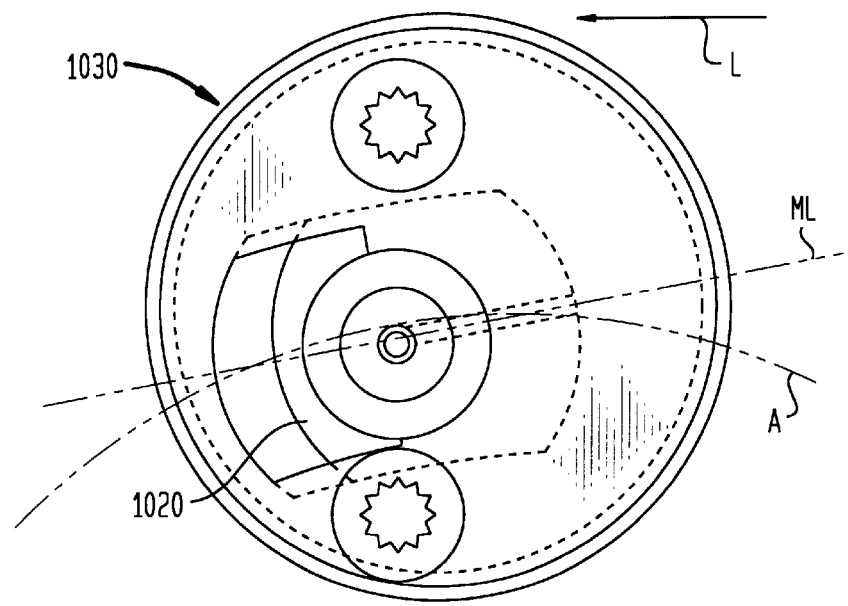
FIG. 32 is a front view of the crankshaft assembly of FIG. 31.

FIGS. 31 and 32 show a tenth alternative adjustable crankshaft of the present invention wherein the active bearing member 1030 is comprised of left and right mating segments 1044 and 1046. A pair of plates 1031, 1031' similar to plates 931 and 931', sealably embrace the mating segments 1044 and 1046. The assembly is held together by fasteners 1033, 1035.

In FIG. 32, it can be appreciated that the medial line ML relative to the crankpin 1020 is not parallel to the direction of the load vector L at the crank angle shown. If one assumes that the crank angle depicted is that at which maximum loading of the crank occurs, one can appreciate that the misalignment of medial line ML and the load vector L will have the effect of diverting loading force from the hydraulic fluid trapped between the active bearing member 1030 and the crankpin 1020 (used to control the displacement of the active bearing member) to the active bearing member/crankpin interface. Thus, in addition to utilizing an arcuate slot in the active bearing member for shielding the hydraulic fluid, one can also utilize a reoriented medial line ML. In this manner, at periods of maximum loading in the cycle, the active bearing member 1030 can transmit loads mechanically and/or frictionally directly to the crankpin 1020.

Figure 33:
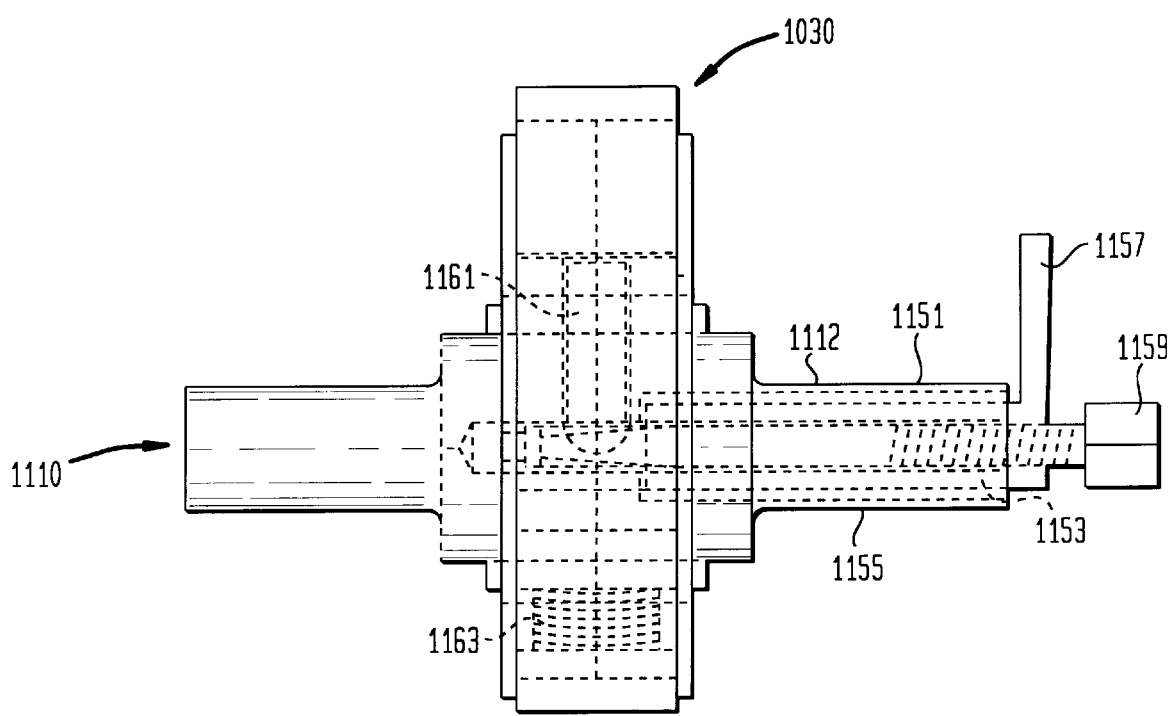
FIG. 33 is a side view of an eighth crankshaft assembly in accordance with an alternative embodiment of the present invention.
Figure 34:
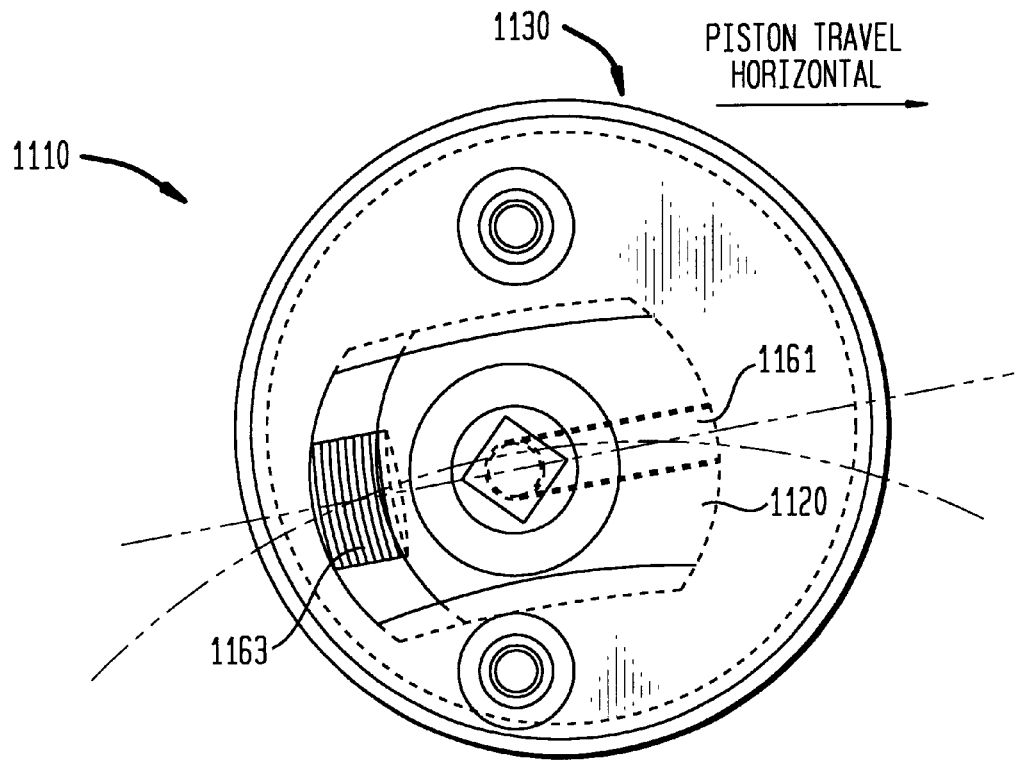
FIG. 34 is a front view of the crankshaft assembly of FIG. 33.
Figure 35:
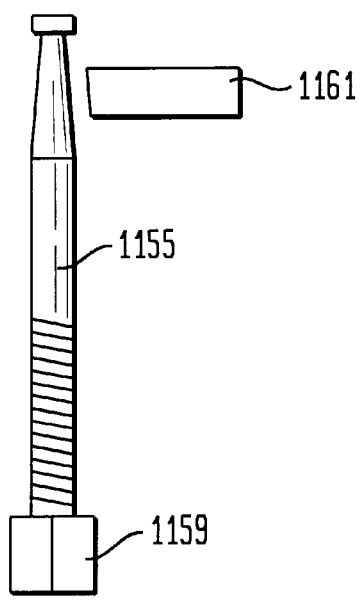
FIG. 35 is a partially schematic plan view of the internal components of the crankshaft assembly of FIGS. 33 and 34.

FIGS. 33–35 depict yet another alternative embodiment of the present invention wherein a threaded cam rod 1155 is threadedly received within a sleeve 1153 having a control arm 1157 for holding the sleeve in a fixed position. The sleeve is inserted into the shaft 1112 of the crankshaft assembly 1110 via a suitable bore 1151 which permits the sleeve 1153 to rotate freely within the bore 1151 as the crankshaft assembly is turned and the sleeve control arm 1157 is held stationary. A bronze bushing, roller bearing or other friction reducer may be introduced between the sleeve 1153 and the bore 1151. The position of the cam rod 1155 is determined by a cam controller 1159 which can simply be a lever arm, knob or other end-effector for rotating the cam rod to a selected position. As the cam rod 1155 is rotated in a first direction it screws into the sleeve 1153 and it inserts into the crankshaft assembly 1110 whereupon a tapered tip thereof 1165 contacts a cam follower 1161. The cam follower presses against the active bearing member 1130 to determine the position of the active bearing member 1130 relative to the center line of the crankshaft. A spring 1163 eliminates lash between the crankpin 1120 and the active bearing member 1130. Rotation of the cam rod 1155 in the opposite direction withdraws it from the assembly 1110 allowing the active bearing member 1130 to assume a position of decreased eccentricity.

Figure 36:
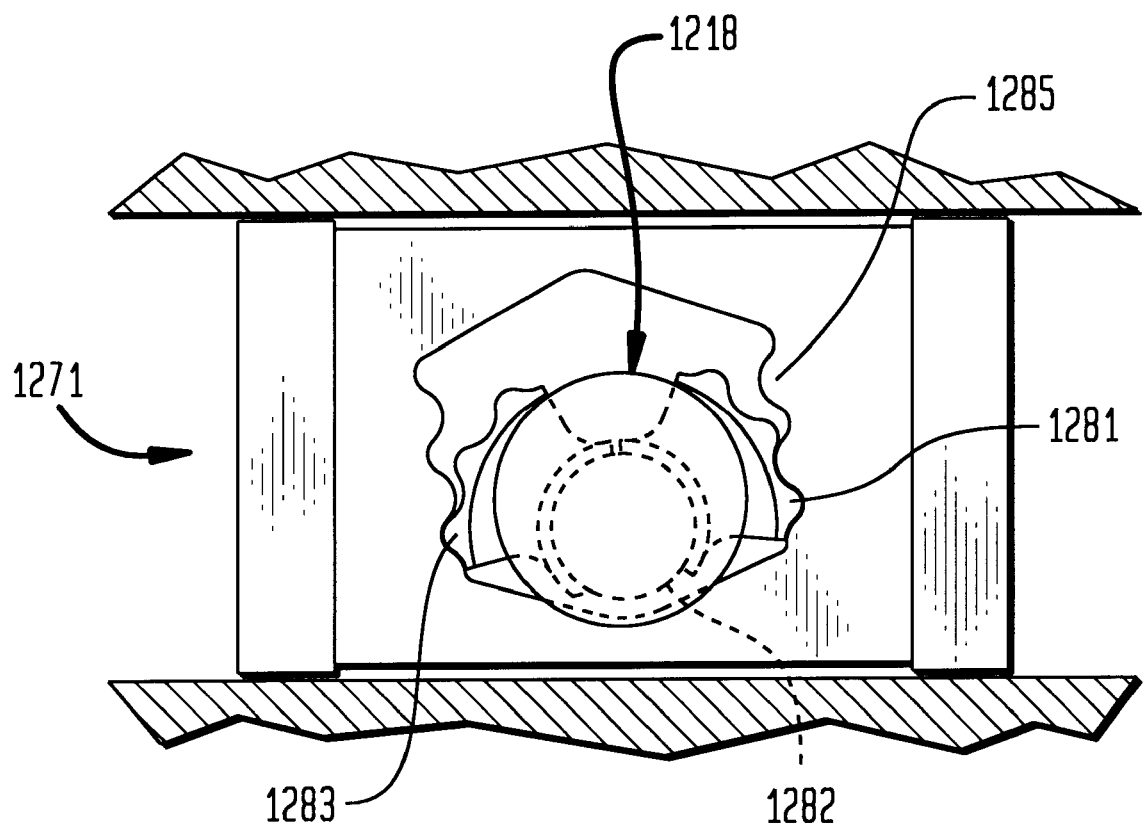
FIG. 36 diagrammatically depicts an adjustable crankshaft in a conjugate drive system.

FIG. 36 shows the above-described adjustable crankshaft employed within a conjugate drive system, such as that shown in FIG. 3. More specifically, FIG. 36 depicts a conjugate drive mechanism 1271 having a pair of conjugate drivers 1281, 1283 interacting with mating conjugate bearing surfaces in a conjugate bearing block 1285. For simplicity of illustration, the main bearing journal 1218 and the periphery 1282 of the crankpin shell assembly illustrate the presence of the crankshaft in a conjugate drive system 1271.

It should be understood that the embodiments described herein are merely exemplary and that a person skilled in the art may make many variations and modifications without departing from the spirit and scope of the invention as defined in the appended claims. For example, while, traditional two-wheeled, upright, rider-powered bicycles are depicted herein, it is clear that the present invention could readily be applied to three or four wheeled cycles and cars and to engine driven vehicles wherein an internal combustion engine or heat engine supplies the motive power in place of a human rider. A wheel motor 1128 may be provided on the front wheel of the bicycle. In similar fashion, the present invention may be utilized to transmit power to the tread of a snowmobile or tank, the propeller of a boat or any other interface element for moving a vehicle. In addition to the task of transmitting power for vehicles, the transmitting apparatus disclosed herein can be utilized for any power transmission task, such as in power generation or machine tool operation. All such modifications and variations are intended to be included within the scope of the invention as defined in the appended claims.

We claim:

1. A transmission for transmitting power between a first mechanical movement and a second mechanical movement, comprising a fluid pump coupled to said first mechanical movement for pumping a fluid; a fluid motor coupled to said second mechanical movement; and a manifold connecting said fluid pump and said fluid motor, said manifold capable of conducting fluid output from said fluid pump to said fluid motor to drive said fluid motor and recirculating said fluid back to said fluid pump, at least one of said fluid pump and said fluid motor incorporating a conjugate drive motion translator, and one of said fluid pump and said fluid motor having a variable displacement volume which is attributable to an adjustable stroke crankshaft.

2. The transmission of claim 1, wherein said transmission is mounted on a wheeled vehicle having an on-board motive power source as said first mechanical movement, said second mechanical movement being coupled to at least one wheel of said vehicle to enable said vehicle to be moved by said power source.

3. The transmission of claim 2, wherein said vehicle is a bicycle and said power source is a human rider and further comprising pedals attached to said fluid pump against which the appendages of said rider may be pushed to activate said pump.

4. The transmission of claim 3, wherein said manifold includes an override shunt passage for circulating fluid through said fluid motor independently of said fluid pump and a first shunt valve for controlling fluid flow through said override shunt passage, said override shunt passage and said first shunt valve permitting said fluid motor to override said fluid pump.

5. The transmission of claim 4, wherein said manifold includes a pressure shunt passage and a second shunt valve for controlling fluid flow through said pressure shunt passage for selectively diverting fluid output of said fluid pump from said fluid motor back to said fluid pump t hereby altering the volume of fluid transmitted by said fluid pump to said fluid motor and permitting the ratio movement between said first mechanical movement and said second mechanical movement to be changed.

6. The transmission of claim 5, wherein said fluid is a liquid at room temperature and atmospheric pressure.

7. The transmission of claim 6, wherein said fluid pump is a reciprocating piston pump utilizing a conjugate drive to translate rotary motion of a power input shaft to reciprocation of a piston of said pump.

8. The transmission of claim 7, wherein said fluid motor is a reciprocating piston pump utilizing a conjugate drive to translate reciprocation of a piston of said pump into rotary motion of a power output shaft.

9. The transmission of claim 1, wherein said adjustable stroke crankshaft has a generally cylindrical shaft, a crankpin coupled to said shaft and a crankpin shell disposed about said crankpin, said shell being radially displaceable to a selected degree of eccentricity relative to said shaft.

10. The transmission of claim 9, wherein at least a portion of said crankpin sealingly engages a surface in an interior hollow of said shell defining a chamber of variable volume, the volume of said chamber depending upon the position of said shell relative to said crankpin and further including a source of pressurized fluid in communication with said chamber such that inflow of pressurized fluid into said chamber results in the movement of said shell in a first direction relative to said crankpin and outflow of fluid results in the movement of said shell in an opposite direction to said first direction.

11. The transmission of claim 9, wherein the selected degree of eccentricity of said shell is controlled by a mechanical linkage.

12. The transmission of claim 1, wherein said manifold is flexible to permit said fluid motor to be repositioned relative said fluid pump while said fluid pump and said fluid motor are connected to said manifold.

13. The transmission of claim 1, further including a brake valve for regulating the flow of fluid through said fluid motor for selectively performing a braking function.

14. A transmission for transmitting power between a first mechanical movement and a second mechanical movement, comprising a fluid pump coupled to said first mechanical movement for pumping a fluid; a fluid motor coupled to said second mechanical movement; a manifold connecting said fluid pump and said fluid motor, said manifold capable of conducting fluid output from said fluid pump to said fluid motor to drive said fluid motor and recirculating said fluid back to said fluid pump, at least one of said fluid pump and said fluid motor incorporating a conjugate drive motion translator; and means for varying the displacement volume of at least one of said fluid pump and said fluid motor, said means for varying including a crankshaft having a generally cylindrical shaft, a crankpin coupled to said shaft and an hydraulically actuated crankpin shell displaceable to a selected degree of eccentricity relative to said shaft.

15. A transmission for transmitting power between a first mechanical movement and a second mechanical movement, comprising a fluid pump coupled to said first mechanical movement for pumping a fluid; a fluid motor coupled to said second mechanical movement; a manifold connecting said fluid pump and said fluid motor, said manifold capable of conducting fluid output from said fluid pump to said fluid motor to drive said fluid motor and recirculating said fluid back to said fluid pump, at least one of said fluid pump and said fluid motor incorporating a conjugate drive motion translator; and means for varying the displacement volume of at least one of said fluid pump and said fluid motor, said means for varying including a crankshaft with a crankpin, a crankpin shell disposed about said crankpin and displaceable to a selected degree thereon and means for mechanically controlling the position of said crankpin shell.

16. A transmission for transmitting power between a first mechanical movement and a second mechanical movement, comprising a fluid pump coupled to said first mechanical movement for pumping a fluid; a fluid motor coupled to said second mechanical movement; a manifold connecting said fluid pump and said fluid motor, said manifold capable of conducting fluid output from said fluid pump to said fluid motor to drive said fluid motor and recirculating said fluid back to said fluid pump, at least one of said fluid pump and said fluid motor incorporating a conjugate drive motion translator; and a crankshaft with a generally cylindrical shaft, a crankpin coupled to said shaft and an active bearing member disposed about said crankpin, said active bearing member being radially displaceable to a selected degree of eccentricity relative to said shaft.

17. The transmission of claim 16, wherein said transmission is mounted on a bicycle for transmitting power from a human rider to a wheel of said bicycle.

18. The transmission of claim 16, wherein said manifold includes an override shunt passage and a clutch passage, fluid flow through said shunt passage controlled by a first valve and fluid flow through said clutch passage controlled by a second valve.

* * * * *